(12) United States Patent  
Caballero de Gea et al.

(10) Patent No.: US 10,853,043 B2  
(45) Date of Patent: Dec. 1, 2020

(54) METHODS AND APPARATUS TO IMPROVE OPTIMIZING LOOPS WITH PREDICTABLE RECURRING MEMORY READS

(71) Applicant: Intel Corporation, Santa Clara, CA (US)

(72) Inventors: Diego Luis Caballero de Gea, Santa Clara, CA (US); Hideki Ido, Sunnyvale, CA (US); Eric N. Garcia, Redwood City, CA (US)

(73) Assignee: INTEL CORPORATION, Santa Clara, CA (US)

( * ) Notice: Subject to any disclaimer, the term of this patent is extended or adjusted under 35 U.S.C. 154(b) by 29 days.

(21) Appl. No.: 16/128,275

(22) Filed: Sep. 11, 2018

(65) Prior Publication Data

US 2019/0042224 A1   Feb. 7, 2019

(51) Int. Cl.
*G06F 8/41*   (2018.01)

(52) U.S. Cl.
CPC ............ *G06F 8/4441* (2013.01); *G06F 8/447* (2013.01)

(58) Field of Classification Search
CPC ........ G06F 8/4441; G06F 8/447; G06F 8/443; G06F 8/452

See application file for complete search history.

(56) References Cited

U.S. PATENT DOCUMENTS

| 4,858,115 A * | 8/1989 | Rusterholz | ............. G06F 9/325 712/7 |
| 8,984,499 B2 * | 3/2015 | Uliel | .................. G06F 9/30032 717/160 |
| 9,015,688 B2 | 4/2015 | Tian et al. | |

* cited by examiner

*Primary Examiner* — Lewis A Bullock, Jr.  
*Assistant Examiner* — Mohammad H Kabir  
(74) *Attorney, Agent, or Firm* — Hanley, Flight & Zimmerman, LLC

(57) ABSTRACT

Methods, apparatus, systems, and articles of manufacture are disclosed to improve loop optimization with predictable recurring memory reads (PRMRs). An example apparatus includes an optimizer including an optimization scenario manager to generate an optimization plan associated with a loop and corresponding optimization parameters, the optimization plan including a set of one or more optimizations, an optimization scenario analyzer to identify the optimization plan as a candidate optimization plan when a quantity of PRMRs included in the loop is greater than a threshold, and a parameter calculator to determine the optimization parameters based on the candidate optimization plan, and a code generator to generate instructions to be executed by a processor, the instructions based on processing the loop with the one or more optimizations included in the candidate optimization plan.

18 Claims, 22 Drawing Sheets

```
struct OptimizationScenario {
  // Target loop nest to be optimized.
  LoopNest;

// Target loop to be optimized within LoopNest.
  Loop;

// Loop collapsing strategy to apply on Loop/LoopNest for
  // this scenario. The parameters below are related to the
  // loop resulting from applying the loop collapsing strategy
  // on Loop/LoopNest.
  CollapsingStrategy;

// Vectorization factor for this scenario.
  VF;

// Unroll factor for this scenario.
  UF;

// PRMRs found in this scenario.
  PRMRs;

// Number of PRMRs found in this scenario.
  NumPRMRs;

// Least-Common-Multiple of all the lengths of the PRMRs.
  PRMRsLengthLCM;

// Execution cost estimation for this loop nest if we
  // optimized PRMRs.
  LoopNestCost;
}
```

FIG. 9

```
bool isPRMR(Loop) { for each read MemRef in Loop {
        MemAccessPattern = compute the representation of the
                           memory access pattern for MemRef
                           in Loop;

if (MemAccessPattern is a periodic function of the Loop
            induction variable with a compile-time constant
            period (i.e., f(Loop induction variable % compile-
            time constant number)))

return true, MemRef is a PRMR with length = period else return false
    }
}
```

FIG. 10

```
OptimizationScenario findBestPRMROptimizationScenario(LoopNest) {

// Collect potential optimization scenarios.
    List<OptimizationScenario> OptScenarios =
        collectPotentialOptimizationScenarios(LoopNest);

// Compute optimization parameters for each optimization scenario
    // and check if their estimated execution cost is better than
    // prior optimization techniques.
    for each Scenario in OptScenarios {
        analyzeOptimizationScenario (Scenario)
    }

BestOptScenario = Compare all the valid scenarios in OptScenarios
                      and select the one with the smallest cost;

Return BestOptScenario;
}
```

FIG. 11

```
List<OptimizationScenario>
collectPotentialOptimizationScenarios(LoopNest) {

List<OptimizationScenario> OptScenarios;

for each Loop in LoopNest {
    LoopScenario = Create new OptimizationScenario for Loop/
                   LoopNest.
    LoopScenario.PRMRs/.NumPRMRs = Collect PRMRs for all MemRefs in
                                   Loop using isPRMR method.

if (LoopScenario.NumPRMRs > 0) {
       Add OptimizationScenario associated with LoopScenario to
       OptScenarios.
    }

List<CollapsingStrategy> CollapsingStrategies;
    CollapsingStrategies = Collect loop collapsing strategies for
                           Loop using prior loop collapsing
                           algorithms.

For each CollStra in CollapsingStrategies {
       CollapScenario = Create new OptimizationScenario for the
                        collapsed loop resulting from CollStra
       CollStra.CollapScenario.PRMRs/.NumPRMRs = Collect PRMRs for
                        all MemRefs in collapsed loop resulting from
                        CollStra, using isPRMR method.

if (CollapScenario.NumPRMRs > LoopScenario.NumPRMRs OR
           LoopScenario.Loop is a low-trip count loop) {
         Add OptimizationScenario associated with CollapScenario to
         OptScenarios.
       }
    }
  }

Return OptScenarios;
}
```

FIG. 12

```
void analyzeOptimizationScenario (OptimizationScenario) { if (Loop has PRMRs AND Loop is Vectorizable) {
      // Compute best vectorization factor, unroll factor and their
      // associated cost for this OptimizationScenario.
      BestVF,BestUF,BestCost =
           computeBestVFUFAndCost(OptimizationScenario)

if (BestCost is lower than cost of prior optimization
            techniques){
         // This optimization scenario is legal and profitable
         OptimizationScenario.VF = BestVF;
         OptimizationScenario.UF = BestUF;
         OptimizationScenario.LoopNestCost = BestCost;
         Return;
      }
   }

// Optimization is NOT legal or profitable
   Mark OptimizationScenario as invalid;
   Return;
}
```

FIG. 13

```
int, int, int computeBestVFUFAndCost (OptimizationScenario) {

List<int> PotentialVFs = Get potential vectorization factors for
                           OptimizationScenario using prior
                           vectorization algorithms.
  OptimizationScenario.PRMRsLengthLCM = Compute LCM of all the PRMRs
                                       length.

BestCost = infinite;
  BestVF = 0;
  BestUF = 0;

For each VF in PotentialVFs {
    // Compute UF
    UF = LCM(VF, OptimizationScenario.PRMRsLengthLCM)/VF;
    Cost = Compute the estimated execution cost that the loop nest
           would have on target computing device after applying this
           optimization scenario with current VF and UF under
           evaluation (i.e, after applying vectorization, unrolling,
           gather-to-shuffle, constant folding, and/or LICM).

if (Cost < BestCost)
      BestCost = Cost;
      BestVF = VF;
      BestUF = UF;
  }

Return BestVF, BestUF, BestCost;
}
```

FIG. 14

```
//Example loop nest of interest to be improved
for (int i = 0; i < 1024; ++i) {
    for (int j = 0; j < 6; j++) {
        float in = input[i*6 + j];
        // 'filter' is PRMR with length 3.
        // 'base' and 'exponent' at NOT PRMRs before
        // collapsing.
        float fil = filter[j%3];
        float b = base[j];
        float exp = exponent[j];
        output[i*6 + j] = in + pow(b, exp) * fil;
    }
}
```

```
//After loop collapsing      1602
for (int ij = 0; ij < 6144; ++ij) {
        float in = input[ij];

// 'filter', 'base' and 'exponent' are PRMRs with
        // length 3, 6, 6, respectively.

float fil = filter[ij%3];
        float b = base[ij%6];
        float exp = exponent[ij%6];
        output[ij] = in + pow(b, exp) * fil;
}
```

FIG. 16

```
//After loop vectorization
for (int ij = 0; ij < 6141; ij+=4) {
    float4 in = vload(&input[ij]);
    int4 gather_offset3 = vremainder({ij,ij+1,ij+2,ij+3},
                                     {3,3,3,3});
    float4 fil = vgather(filter, gather_offset3);
    int4 gather_offset6 = vremainder({ij,ij+1,ij+2,ij+3},
                                     {6,6,6,6});
    float4 b = vgather(base, gather_offset6);
    float4 exp = vgather(exponent, gather_offset6);
    vstore(&output[ij], in + pow4(b, exp) * fil);
}
```

FIG. 17

```
//After loop unrolling                    ╱─1802
    for (int ij = 0; ij < 6133; ij+=12) {
        // Unrolled Iteration 1
        float4 in_1 = vload(&input[ij]);
        int4 gather_offset3_1 = vremainder({ij,ij+1,ij+2,ij+3},
                                            {3,3,3,3});
        float4 fil_1 = vgather(filter, gather_offset3_1);
        int4 gather_offset6_1 = vremainder({ij,ij+1,ij+2,ij+3},
                                            {6,6,6,6});
        float4 b_1 = vgather(base, gather_offset6_1);
1804    float4 exp_1 = vgather(exponent, gather_offset6_1);
        vstore(&output[ij], in_1 + pow4(b_1, exp_1) * fil_1);

// Unrolled Iteration 2
        float4 in_2 = vload(&input[ij+4]);
        int4 gather_offset3_2 = vremainder({ij+4,ij+5,ij+6,ij+7},
                                            {3,3,3,3});
        float4 fil_2 = vgather(filter, gather_offset3_2);
        int4 gather_offset6_2 = vremainder({ij+4,ij+5,ij+6,ij+7},
                                            {6,6,6,6});
        float4 b_2 = vgather(base, gather_offset6_2);
        float4 exp_2 = vgather(exponent, gather_offset6_2);
        vstore(&output[ij+4], in_2 + pow4(b_2, exp_2) * fil_2);

// Unrolled Iteration 3
        float4 in_3 = vload(&input[ij+8]);
        int4 gather_offset3_3 = vremainder({ij+8,ij+9,ij+10,ij+11},
                                            {3,3,3,3});
        float4 fil_3 = vgather(filter, gather_offset3_3);
        int4 gather_offset6_3 = vremainder({ij+8,ij+9,ij+10,ij+11},
                                            {6,6,6,6});
        float4 b_3 = vgather(base, gather_offset6_3);
        float4 exp_3 = vgather(exponent, gather_offset6_3);
        vstore(&output[ij+8], in_3 + pow4(b_3, exp_3) * fil_3);
    }
```

FIG. 18

```
//After constant folding                          1902
for (int ij = 0; ij < 6133; ij+=12) {
    // Unrolled Iteration 1
    float4 in_1 = vload(&input[ij]);
    int4 gather_offset3_1 = {0,1,2,0}
    float4 fil_1 = vgather(filter, gather_offset3_1);
    int4 gather_offset6_1 = {0,1,2,3}
    float4 b_1 = vgather(base, gather_offset6_1);
    float4 exp_1 = vgather(exponent, gather_offset6_1);
    vstore(&output[ij], in_1 + pow4(b_1, exp_1) * fil_1);

// Unrolled Iteration 2
    float4 in_2 = vload(&input[ij+4]);
    int4 gather_offset3_2 = {1,2,0,1}
    float4 fil_2 = vgather(filter, gather_offset3_2);
    int4 gather_offset6_2 = {4,5,0,1}
    float4 b_2 = vgather(base, gather_offset6_2);
    float4 exp_2 = vgather(exponent, gather_offset6_2);
    vstore(&output[ij+4], in_2 + pow4(b_2, exp_2) * fil_2);

// Unrolled Iteration 3
    float4 in_3 = vload(&input[ij+8]);
    int4 gather_offset3_3 = {2,0,1,2}
    float4 fil_3 = vgather(filter, gather_offset3_3);
    int4 gather_offset6_3 = {2,3,4,5}
    float4 b_3 = vgather(base, gather_offset6_3);
    float4 exp_3 = vgather(exponent, gather_offset6_3);
    vstore(&output[ij+8], in_3 + pow4(b_3, exp_3) * fil_3);
}
```

FIG. 19

```
//After gather-to-shuffle optimization
    for (int ij = 0; i < 6133; ij+=12) {
        // Unrolled Iteration 1
        float4 in1 = vload(&input[ij]);
        float4 fil_load = vload(filter);
        float4 base_load1 = vload(base);
        float4 base_load2 = vload(&base[4]);
        float4 exp_load1 = vload(exponent);
        float4 exp_load2 = vload(&exponent[4]);
        float4 fil_0120 = vshuffle(fil_load, {0, 1, 2, 0});
        float4 base_0123 = base_load1;
        float4 exp_0123 = exp_load1;
        float4 vmul_pow4_1 =
            vmul(pow4(base_0123,exp_0123),fil_0120));
        vstore(&output[ij], vadd(in1, vmul_pow4_1);

// Unrolled Iteration 2
        float4 in2 = vload(&input[ij+4]);
        float4 fil_1201 = vshuffle(fil_load, {1, 2, 0, 1});
        float4 base_4501 = vshuffle(base_load1, base_load2,
            {4,5,0,1});
        float4 exp_4501 = vshuffle(exp_load1, exp_load2, {4, 5, 0,
            1});
        float4 vmul_pow4_2 =
            vmul(pow4(base_4501,exp_4501),fil_1201));
        vstore(&output[ij+4], vadd(in2, vmul_pow4_2);

// Unrolled Iteration 3
        float4 in3 = vload(&input[ij+8]);
        float4 fil_2012 = vshuffle(fil_load, {2, 0, 1, 2});
        float4 base_2345 = vshuffle(base_load1, base_load2,
            {2,3,4,5});
        float4 exp_2345 = vshuffle(exp_load1, exp_load2, {2, 3, 4,
            5});
        float4 vmul_pow4_3 =
            vmul(pow4(base_2345,exp_2345),fil_2012));
        vstore(&output[ij+8], vadd(in3, vmul_pow4_3);
    }
```

FIG. 20

```
//After Loop Invariant Code Motion
float4 fil_load = vload(filter);
float4 fil_0120 = vshuffle(fil_load, {0, 1, 2, 0});
float4 fil_1201 = vshuffle(fil_load, {1, 2, 0, 1});
float4 fil_2012 = vshuffle(fil_load, {2, 0, 1, 2});
float4 base_load1 = vload(base);
float4 base_load2 = vload(&base[4]);
float4 base_0123 = base_load1;
float4 base_4501 = vshuffle(base_load1, base_load2,{4, 5, 0, 1});
float4 base_2345 = vshuffle(base_load1, base_load2,{2, 3, 4, 5});
float4 exp_load1 = vload(exponent);
float4 exp_load2 = vload(&exponent[4]);
float4 exp_0123 = exp_load1;
float4 exp_4501 = vshuffle(exp_load1, exp_load2, {4, 5, 0, 1});
float4 exp_2345 = vshuffle(exp_load1, exp_load2, {2, 3, 4, 5});
float4 vmul_pow4_1 = vmul(pow4(base_0123, exp_0123), fil_0120));
float4 vmul_pow4_2 = vmul(pow4(base_4501, exp_4501), fil_1201));
float4 vmul_pow4_3 = vmul(pow4(base_2345, exp_2345), fil_2012));

for (int ij = 0; ij < 6133; ij+=12) {
    // Unrolled Iteration 1
    float4 in1 = vload(&input[ij]);
    vstore(&output[ij], vadd(in1, vmul_pow4_1);

// Unrolled Iteration 2
    float4 in2 = vload(&input[ij+4]);
    vstore(&output[ij+4], vadd(in2, vmul_pow4_2);

// Unrolled Iteration 3
    float4 in3 = vload(&input[ij+8]);
    vstore(&output[ij+8], vadd(in3, vmul_pow4_3);
}

// Processed Loop to Reduce Execution Cost of Computing Device
```

FIG. 21

METHODS AND APPARATUS TO IMPROVE OPTIMIZING LOOPS WITH PREDICTABLE RECURRING MEMORY READS

FIELD OF THE DISCLOSURE

This disclosure relates generally to computers and, more particularly, to methods and apparatus to improve optimizing loops with predictable recurring memory reads.

BACKGROUND

Memory operations are one of the most time-consuming operations in a computer program. Many compiler optimizations are aimed at reducing a quantity of the memory operations to improve the execution time of the program. In particular, some loop optimizations attempt to hoist and/or otherwise move memory operations outside of loops to reduce a number of times the memory operations are executed. However, hosting some of these memory operations is not straightforward and may require sophisticated loop optimizations. This is the case of memory reads that describe a predictable recurring memory access pattern across the iterations of the loop.

BRIEF DESCRIPTION OF THE DRAWINGS

FIG. 9 depicts example machine readable instructions that may be executed to implement the example optimizer of FIG. 2 to store optimization information associated with an optimization scenario.

FIG. 10 depicts example machine readable instructions that may be executed to implement the example optimizer of FIG. 2 to detect PRMRs in high-level language instructions.

FIG. 11 depicts example machine readable instructions that may be executed to implement the example optimizer of FIG. 2 to execute an optimization cost model based on detected PRMR(s) to identify an optimization scenario.

FIG. 12 depicts example machine readable instructions that may be executed to implement the example optimizer of FIG. 2 to determine candidate optimization scenarios corresponding to a loop and/or a loop nest of interest.

FIG. 13 depicts example machine readable instructions that may be executed to implement the example optimizer of FIG. 2 to analyze a candidate optimization scenario corresponding to a loop and/or a loop nest of interest.

FIG. 14 depicts example machine readable instructions that may be executed to implement the example optimizer of FIG. 2 to calculate optimization parameters including a best cost parameter corresponding to a candidate optimization scenario of interest.

FIG. 15 depicts example machine readable instructions that may be improved and/or otherwise optimized by the example optimizer of FIG. 2.

FIG. 16 depicts example machine readable instructions generated by the example optimizer of FIG. 2 after performing loop collapsing on the machine readable instructions of FIG. 15 based on an optimization scenario.

FIG. 17 depicts example machine readable instructions generated by the example optimizer of FIG. 2 after performing loop vectorization on the machine readable instructions of FIG. 16 based on the optimization scenario.

FIG. 18 depicts example machine readable instructions generated by the example optimizer of FIG. 2 after performing loop unrolling on the machine readable instructions of FIG. 17 based on the optimization scenario.

FIG. 19 depicts example machine readable instructions generated by the example optimizer of FIG. 2 after performing constant folding on the machine readable instructions of FIG. 18 based on the optimization scenario.

FIG. 20 depicts example machine readable instructions generated by the example optimizer of FIG. 2 after performing gather-to-shuffle optimization on the machine readable instructions of FIG. 19 based on the optimization scenario.

FIG. 21 depicts example machine readable instructions generated by the example optimizer of FIG. 2 after performing loop invariant code motion on the machine readable instructions of FIG. 20 based on the optimization scenario.

The figures are not to scale. In general, the same reference numbers will be used throughout the drawing(s) and accompanying written description to refer to the same or like parts.

DETAILED DESCRIPTION

Figure 1:
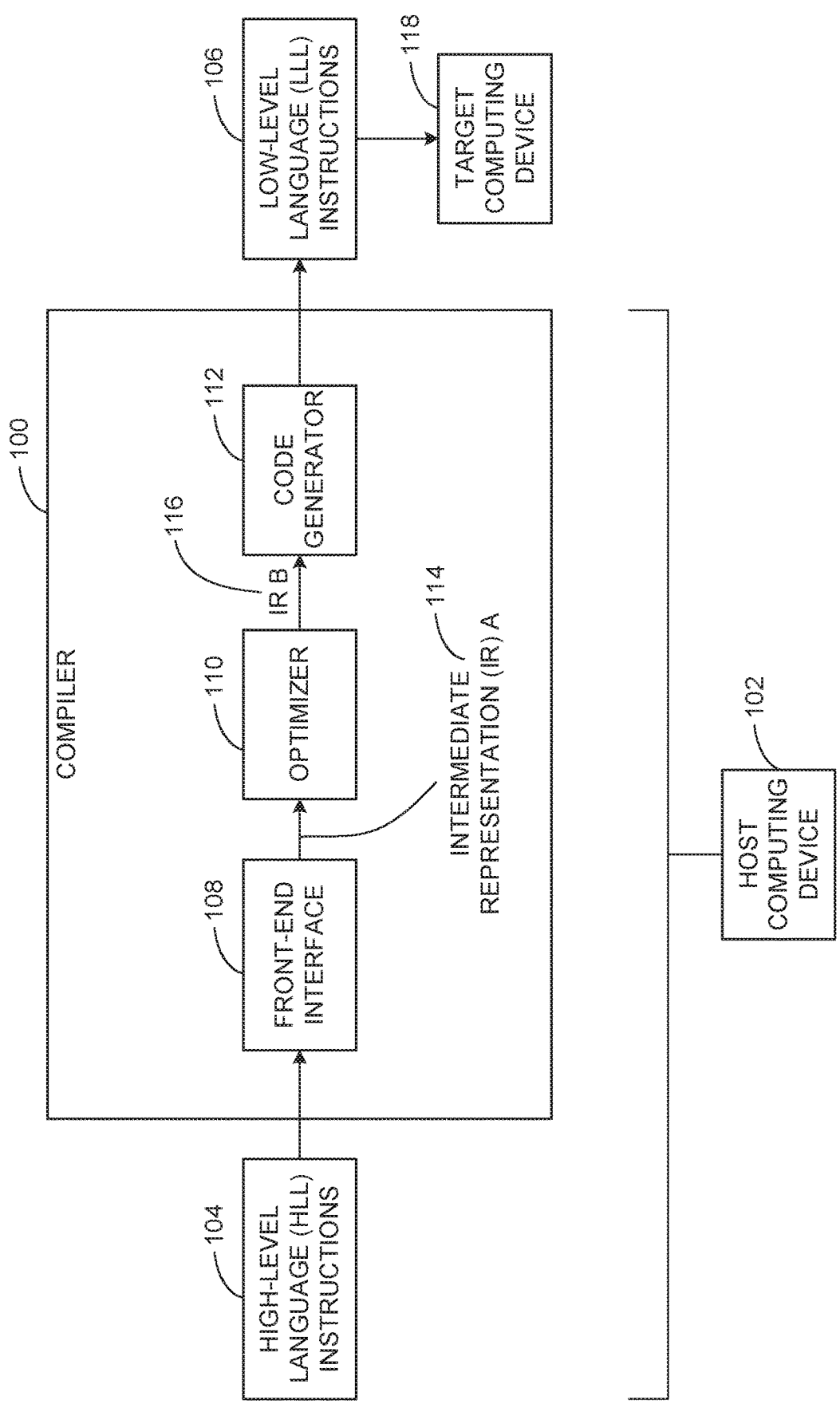
FIG. 1 is a block diagram of an example implementation of an example compiler included in an example host computing device to improve optimizing loops with predictable recurring memory reads (PRMRs).

A typical computing device may include a computer code-optimizing compiler that implements optimization algorithms, where the compiler transforms portions and/or an entirety of computer-based programs to produce code that may efficiently utilize a processor. The computer code-optimizing compiler may implement the optimization algorithms to improve metrics of the computer-based program such as execution time, memory usage, code size, etc. A typical optimization technique is loop optimization that reformulates expressions containing set looping functions to increase execution speed of post-loop optimized code. In some instances, loop vectorization is conducted on the loop optimized code. Loop vectorization is a process implemented by a compiler at compile time to convert a procedural loop (e.g., a high-level language (HLL) loop, a programming loop, a software loop, etc.) into machine readable instructions that iterates over multiple pairs of data items and assigns a separate processing unit to each pair. Typical computing programs spend most of their execution times within such loops. By vectorizing a procedural loop during a compile time, a computing device may, during runtime or execution time, execute machine readable instructions including the vectorized procedural loop with a lower execution cost compared to an execution cost associated with executing a non-vectorized procedural loop. Unlike a vectorized loop in which a processor processes one operation on multiple pairs of operands at once, a processor handles a non-vectorized loop by processing a single pair of operands at a time, which results in higher execution time due to an increased quantity of performed sequential processes.

Loop-optimization algorithms, including loop vectorization, may focus on optimizing loops that include memory loads which, at a compile time, have a predictable pattern of recurring memory accesses to one or more (relatively) small look-up tables. Such memory loads are referred to herein as predictable recurring memory reads (PRMRs). PRMRs are typical in loop nests (e.g., a (programming) construction that includes one or more sibling and/or nested loops), where at least one of the loops has a low trip count (i.e., a low quantity of iterations). In some examples, PRMRs are in loop nests where one or more operations of the loop nests could also be expressed using a low trip count loop. In some examples, a quantity of iterations associated with a loop is referred to as an iteration space. As used herein, a "trip count" refers to a number of times a loop executes. For example, a low trip count loop may refer to a loop that does not have sufficient iterations for vectorization to be cost effective. For example, a first computational time (e.g., a first execution cost) needed to execute the vectorized loop may be greater than a second computational time needed to execute the non-vectorized loop.

PRMRs are memory loads having an access pattern that is a periodic function of an induction variable of such a loop and other loop constants and describes and/or otherwise represents a small recurrent pattern across the iterations of the loop. As used herein, the terms "induction variable" and "loop induction variable" are used interchangeably and refer to a variable that increases or decreases by a fixed amount on every iteration of a loop or is a linear function of another induction variable. The following loop nest is an example where a loop with a low trip count will contain the PRMR of B[j] after collapsing the inner loop j with the outer loop i:

```
for (int i = 0; i < WIDTH; ++i) {
    for (int j = 0; j < 3; ++j) {
        output[i*WIDTH + j] = A[i*WIDTH + j] * B[j];
    }
}
```

In some instances, a loop without a low trip count contains PRMRs. The following loop is an example where the loop does not have a low trip count but contains the PRMR of filter[i %5]:

```
for (int i = 0; i < N; ++i) {
    output[i] = input[i] * sinf(filter[i%5]);
}
```

In the above example, the loop including the term filter[i %5] is not considered a low trip count loop but is instead a high trip count loop. For example, a low trip count loop may correspond to a loop having fewer than 64 iterations, 128 iterations, etc., and a higher trip count may correspond to a loop having more than 64 iterations, 128 iterations, etc.

In some prior vectorization techniques, vectorization of PRMRs may result in vector gather operations that may inhibit the vectorization of the whole loop due to expensive execution cost. Vector gather operations are used by a compiler to sequentially read data that may not be sequentially adjacent to each other in memory. In some prior vectorization techniques, vectorization optimizations may turn such vector gather operations into a more efficient sequence of stride-one vector loads and vector shuffle instructions (e.g., instructions that permute scalar elements within and across vector registers) or vector rotation instructions (e.g., instructions that rotate scalar elements within a vector register). However, even after such optimizations, the loop nests can still be optimized further as demonstrated with examples disclosed herein.

As used herein, the term "execution cost" refers to one or more computing resources (e.g., processing resources, memory resources, storage resources, etc.) used to perform a computing task. For example, an execution cost may refer to a quantity of processing power (e.g., gigahertz (GHz) of processing power), a quantity of processor clock cycles, a time duration during which the quantity of processing power is used, etc., to execute an algorithm (e.g., an optimization algorithm). In other examples, the execution cost may refer to the quantity of processing power, the time duration, etc., to execute machine readable instructions on a computing device (e.g., a host computing device, a target computing device, etc.).

In some prior optimization techniques, such as loop unrolling, loop optimization may prove beneficial for scalar PRMRs, but may make vectorization inefficient or, in some instances, not profitable from an execution cost perspective. For example, loop unrolling may lead to low profitability of the vector register, the vector broadcast operations for PRMRs, and/or the vector gather or the scatter operations for non-PRMRs memory accesses.

Some prior compilers recognize trivial small recurring address patterns like "A[i & 3]," where "i" is the induction variable of the loop, and guide vectorization to choose the vectorization factor (VF) of four (4). By selecting four as the VF, the prior compilers may designate a vector load of <A[0], A[1], A[2], A[3]> to become invariant with respect to the 4-way vectorized i-loop. However, such prior compilers are limited to a length of recurring patterns that exactly matches a supported VF (e.g., VF=4), which is a power-of-two for x86-based computing systems. For example, the PRMRs of B[j] and filter[i %5], as described in the above loop examples, would not be optimized with such prior compilers because the length of their recurring pattern is 3 and 5, respectively, where both lengths are not based on a power-of-two.

Some prior compilers implement a gather-to-shuffle optimization. Gather-to-shuffle is a technique that may turn computationally expensive vector gather operations into more efficient sequences of stride-one vector loads and vector shuffle instructions. In some instances, gather-to-shuffle may be utilized to optimize vector gather instructions on PRMRs whose recurring pattern length does not match with the VF, such as filter[i %5] as described above when the VF=8. In such instances, gather-to-shuffle may optimize PRMRs after vectorization by hoisting the vector loads outside of the loop.

In such prior compilers, however, vector shuffle and/or vector rotate instructions must remain inside the loop body. For example, if the loop in the second example described above (e.g., the loop including the PRMR of filter[i %5]) is vectorized with VF=8, the gather-to-shuffle optimization can hoist the vector load <filter[0], filter[1], filter[2], filter[3], filter[4], filter[0], filter[1], filter[2]> outside of the loop for the first iteration. However, vector shuffle and/or vector rotation instructions necessary to create the right vector values for subsequent iterations, such as <filter[3], filter[4], filter[0], filter[1], filter[2], filter[3], filter[4], filter[0]>, <filter[1], filter[2], filter[3], filter[4], filter[0], filter[1], filter[2], filter[3]>, etc., will remain in the loop body. Therefore, any computation that depends on such vector values (e.g., the sin f( ) function call portion of sin f(filter[i %5]) also has to remain inside the loop and, thus, reduce the effectiveness of the optimization method.

Other prior compilers implement arbitrary loop collapsing and loop unrolling optimizations that may turn PRMRs into loop invariant memory loads if the optimizations collapse and unroll the loop with the proper unroll factor (UF). However, such compilers determine the collapsing strategy and UF without taking into account any information about PRMRs and optimization parameters associated with the PRMRs. In such examples, the prior compilers may use a collapsing strategy or UF that prevent the optimization of PRMRs.

Examples disclosed herein improve and/or otherwise optimize transformations on loops including PRMRs by determining optimization parameters based on the loops and applying a sequence of loop transformations on the loops using the determined optimization parameters. Examples disclosed herein determine the optimization parameters by cost modeling optimization techniques to determine one or more improved sequences of operations over prior implementations of optimization techniques of prior compilers.

Examples disclosed herein select one of the improved sequences and determine the optimization parameters based on the selected sequence. Examples disclosed herein implement the sequence to efficiently vectorize a loop nest including the loops and, correspondingly, convert PRMRs into loop invariant vector memory loads and vector shuffle instructions. Examples disclosed herein implement the sequence to convert the PRMRs into loop-invariant loads and dependent instructions by transforming the original loop (e.g., the loop to be optimized) into another loop with a different or new sequence of instructions in the loop body. In some disclosed examples, the new loop includes machine-readable instructions representative of a quantity of iterations of the original loop that is a multiple of the lengths of the PRMRs. In some disclosed examples, the quantity of iterations corresponds to a least common multiple (LCM) of the lengths of the PRMRs. In other disclosed examples, the quantity of iterations corresponds to a multiple of the LCM of the lengths of the PRMRs. Examples disclosed herein move the loop invariant vector memory loads and corresponding loop invariant instructions dependent on the loop invariant memory loads out of the loop and generate machine readable instructions based on the vectorized loops. Examples disclosed herein execute the generated machine readable instructions in less time and/or with less computational resources compared to executing machine readable instructions generated on non-vectorized versions of the loops.

FIG. 1 is a block diagram of an example implementation of an example compiler 100 included in an example host computing device 102 to improve optimizing loops with PRMRs. The example host computing device 102 can be, for example, a server, a personal computer, a workstation, a mobile device (e.g., a cell phone, a smart phone, a tablet such as an iPad™), or any other type of computing device that includes one or more processors. The example compiler 100 is implemented by a computer that executes a computer-based program that converts example high-level language (HLL) instructions 104 into example low-level language (LLL) instructions 106. In FIG. 1, the example HLL instructions 104 can correspond to instructions prepared using a HLL such as C, C++, Java, etc. In FIG. 1, the example LLL instructions 106 can correspond to machine-code that can be read and/or otherwise executed by a computer (e.g., binary object code that is loadable into and executable directly by a computer's central processing unit (CPU)). For example, the LLL instructions 106 may correspond to IA32 assembly language, MC68000 assembly language, etc.

In the illustrated example of FIG. 1, the compiler 100 includes an example front-end interface 108, an example optimizer 110, and an example code generator 112. The example front-end interface 108 of FIG. 1 receives and/or otherwise obtains the example HLL instructions 104 from a user (e.g., a programmer), a software application (e.g., an integrated development environment (IDE) programming environment), a computing device including one or more processors, etc., and/or a combination thereof.

In some examples, the front-end interface 108 verifies syntax and semantics of the HLL instructions 104 according to a specific source language (e.g., C, C++, Java, Python, etc.). For statically-typed languages, the example front-end interface 108 performs type checking by collecting type information. For example, if an input program corresponding to the HLL instructions 104 is syntactically incorrect or has a type error (e.g., a typographical error), then the front-end interface 108 generates error(s) and/or warning(s). In some examples, the front-end interface 108 performs lexical analysis, semantic analysis, syntax analysis, etc., and/or a combination thereof. The example front-end interface 108 transforms the example HLL instructions 104 into a first example intermediate representation (IR) (IR A) 114, or first example IR instructions 114, for further processing by the example optimizer 110. In FIG. 1, the first example IR 114 is a lower-level representation of the program associated with the example HLL instructions 104.

In the illustrated example of FIG. 1, the optimizer 110 receives and/or otherwise obtains the first IR 114 from the front-end interface 108. The example optimizer 110 performs optimizations on the first example IR 114 that are independent of the CPU architecture being targeted for deployment. For example, the independence of the HLL instructions 104 and the LLL instructions 106 is intended to enable generic optimizations to be shared between versions of the compiler 100 supporting different source languages and target processors. In some examples, the optimizer 110 improves and/or otherwise optimizes the first IR 114 prior to conversion to the LLL instructions 106 by the code generator 112 by generating a second example IR (IR B) 116. For example, the optimizer 110 may execute a loop optimization algorithm, such as vectorization, loop unrolling, loop collapsing, loop interchange, loop fusion, loop distribution, etc., to convert one or more PRMRs in a loop into loop-invariant loads. In other examples, the optimizer 110 may perform loop invariant code motion (LICM) corresponding to motion of code that is loop invariant outside of the loop.

In some examples, the optimizer 110 performs dead code elimination (e.g., removal of useless code) and/or reachability analysis (e.g., identify and remove unreachable code). In some examples, the optimizer 110 performs constant propagation, or discovery and propagation of constant values in the first IR 114. In some examples, the optimizer 110 performs relocation of code associated with a computation to a less frequently executed place in memory (e.g., out of a loop).

In the illustrated example of FIG. 1, the compiler 100 includes the code generator 112 to receive and/or otherwise obtain the second IR 116 from the optimizer 110. In some examples, the code generator 112 processes the second IR 116 by performing additional transformations and/or optimizations that are specific for a target CPU architecture corresponding to an example target computing device 118. The example target computing device 118 can be, for example, a server, a personal computer, a workstation, a mobile device (e.g., a cell phone, a smart phone, a tablet such as an iPad™), or any other type of computing device that includes one or more processors.

The example code generator 112 of the illustrated example of FIG. 1 generates the target-dependent assembly code and performs register allocation during the generation. In some examples, the code generator 112 performs instruction scheduling, which re-orders instructions to keep parallel execution units busy by filling delay slots. The example code generator 112 generates the example LLL instructions 106, where the LLL instructions 106 can correspond to machine-readable instructions specialized and/or otherwise tailored for a particular processor and/or operating system included in the example target computing device 118. For example, the target computing device 118 may execute the LLL instructions 106 that are generated based on the examples disclosed herein.

Figure 2:
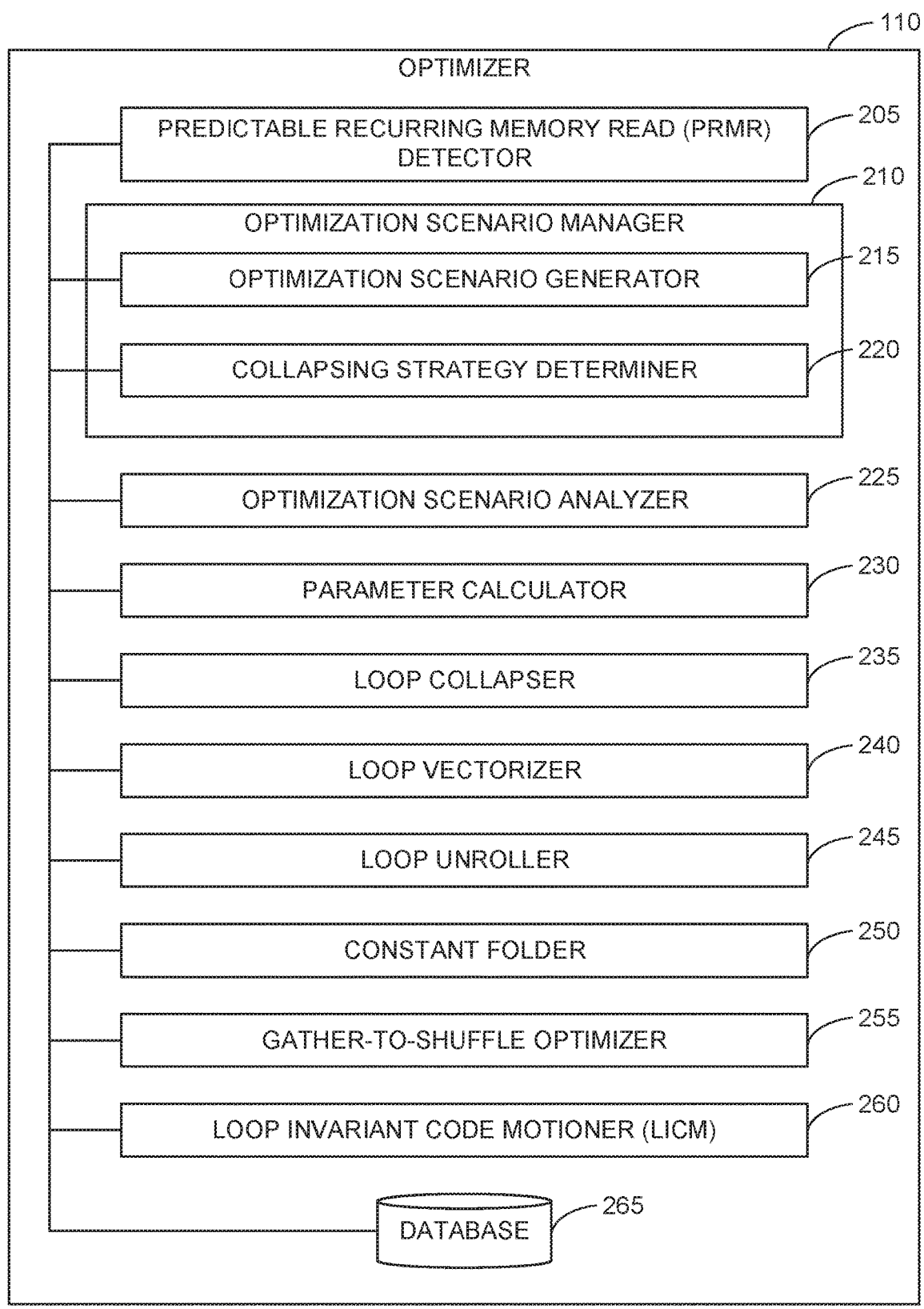
FIG. 2 is a block diagram of an example optimizer included in the example compiler of FIG. 1.

FIG. 2 is a block diagram of the example optimizer 110 included in the example compiler 100 of FIG. 1. The example optimizer 110 improves and/or otherwise optimizes loops included in the first example IR 114 based on the example HLL instructions 104 of FIG. 1 prior to generating the example LLL instructions 106 of FIG. 1. The example optimizer 110 improves an efficiency of one or more target processors included in the example target computing device 118 of FIG. 1 by reducing the execution time required to implement and/or otherwise execute the example LLL instructions 106.

In some examples, the optimizer 110 detects and/or otherwise identifies loops included in the first IR 114 that include at least one PRMR. The example optimizer 110 can determine one or more optimization scenarios, calculate optimization parameters associated with the one or more optimization scenarios, and determine one of the optimization scenarios to be processed based on the one of the optimization scenarios having the smallest cost (e.g., computational cost, execution cost, etc.). The example optimizer 110 processes the identified loops including the at least one PRMR based on the determined optimization scenario and/or the corresponding optimization parameters to generate the second example IR 116 of FIG. 1. As used herein, the terms "optimization scenario" or "optimization plan" are used interchangeably and may refer to an arrangement, a configuration, and/or a sequence in which the example optimizer 110 processes and/or otherwise transforms a loop and/or a loop nest of interest based on at least one of one or more loop collapsing strategies, loop optimization techniques, and/or one or more optimization parameters (e.g., a UF parameter, a VF parameter, a cost parameter, etc.). In some examples, the optimizer 110 includes one or more other prior compiler optimization techniques not described herein that enable and/or otherwise facilitates an operation of the optimizer 110.

The example optimizer 110 of FIG. 2 includes an example PRMR detector 205, an example optimization scenario manager 210, an example optimization scenario generator 215, an example collapsing strategy determiner 220, an example optimization scenario analyzer 225, an example parameter calculator 230, an example loop collapser 235, an example loop vectorizer 240, an example loop unroller 245, an example constant folder 250, an example gather-to-shuffle optimizer 255, an example LICM 260, and an example database 265 to improve and/or otherwise optimize loops based on the detection of one or more PRMRs.

In the illustrated example of FIG. 2, the optimizer 110 includes the PRMR detector 205 to detect PRMRs in the context of a loop included in the first IR 114 based on the FILL instructions 104 of FIG. 1. In some examples, the PRMR detector 205 selects a loop of interest included in the first IR 114. The example PRMR detector 205 can select a read memory reference (MemRef) in the selected loop for processing. In some examples, the PRMR detector 205 includes means to compute and/or otherwise determine the representation of the memory access pattern for the selected MemRef. In some examples, the PRMR detector 205 determines whether the MemRef memory access pattern is a periodic function of the loop induction variable with a compile-time constant period (e.g., f(loop induction variable % compile-time constant number), as in filter[i %5]). In response to determining that the MemRef memory access pattern is such a periodic function, the example PRMR detector 205 identifies the MemRef as a PRMR with a length of the associated period.

In the illustrated example of FIG. 2, the optimizer 110 includes the optimization scenario manager 210 to collect and/or otherwise determine candidate or potential optimization scenarios for each loop of interest. In some examples, the optimization scenario manager 210 includes means to determine one or more candidate loop collapsing strategies that can be used to optimize detected PRMRs or expose PRMRs that are associated with other loops in a loop nest of interest. In the example of FIG. 2, the optimization scenario manager 210 includes the optimization scenario generator 215 and the collapsing strategy determiner 220.

In the illustrated example of FIG. 2, the optimization scenario manager 210 includes the optimization scenario generator 215 to create and/or otherwise generate an optimization scenario for each loop in a loop nest included in the first IR 114 of FIG. 1. In some examples, the optimization scenario includes one or more optimizations or optimization operations that can be performed on a loop in a loop nest to convert and/or otherwise transform the first IR 114 into the second IR 116. For example, the optimization scenario generator 215 may generate a first optimization scenario corresponding to a first loop in a loop nest. The example optimization scenario generator 215 may determine a first quantity of PRMRs included in the first loop by invoking the PRMR detector 205 to determine the first quantity of PRMRs. In some examples, the optimization scenario generator 215 queries the database 265 to retrieve the first quantity of PRMRs corresponding to all MemRefs in the first loop as determined by the example PRMR detector 205. In some examples, the optimization scenario generator 215 includes means to identify the first optimization scenario as a candidate optimization scenario when the first quantity of PRMRs is greater than a PRMR threshold. For example, the optimization scenario generator 215 may identify the first optimization scenario as a candidate optimization scenario when the first quantity of PRMRs associated with the first loop is greater than a PRMR threshold of zero PRMRs. The example optimization scenario generator 215 may determine that a quantity of PRMRs associated with the first optimization scenario is the first quantity of PRMRs when the first quantity of PRMRs satisfy the PRMR threshold.

In some examples, the optimization scenario generator 215 generates a second optimization scenario corresponding to the first loop in the loop nest. For example, the first loop may have a first iteration space representative of a quantity of iterations that are executed by the target computing device 118 when the target computing device 118 processes the first loop. The example optimization scenario generator 215 may determine a second set of one or more optimizations, where ones of the second set transform the first loop with a set of loops included in the loop nest to generate a second loop, where the second loop has a second iteration space different from the first iteration space. In response to transforming the first loop into the second loop by performing ones of the one or more optimizations included in the second set, the second loop may include second PRMRs. In some examples, the second loop executes in a single iteration corresponding to the quantity of iterations of the first loop. In some examples, the quantity of iterations are based on a multiple of a least common multiple of one or more lengths associated with the PRMRs associated with at least one of the first loop or the second loop.

In the illustrated example of FIG. 2, the optimization scenario manager 210 includes the collapsing strategy determiner 220 to identify and/or otherwise collect loop collapsing strategies applicable to a loop of interest using prior loop collapsing algorithms. In some examples, the optimization scenario generator 215 generates an optimization scenario for each identified loop collapsing strategy. For example, the collapsing strategy determiner 220 may determine one or more loop collapsing strategies corresponding to the first loop. The example optimization scenario generator 215 may generate a second optimization scenario associated with a first one of the loop collapsing strategies. The first one of the loop collapsing strategies may include collapsing the first loop with at least a second loop to generate a collapsed loop. A second one of the loop collapsing strategies may include collapsing the second loop with at least the first loop to generate a collapsed loop. In some examples, the collapsing strategy determiner 220 includes means to determine a second quantity of PRMRs associated with the collapsed loop (e.g., the loop resulting from the first loop when processed by the first one of the loop collapsing strategies).

In some examples, the collapsing strategy determiner 220 determines the second quantity of PRMRs associated with the first loop collapsing strategy by (1) applying the first loop collapsing strategy to at least the first loop and the second loop to create the collapsed loop and (2) invoking the PRMR detector 205 to determine the second quantity of PRMRs of the collapsed loop. Additionally or alternatively to performing a loop collapsing algorithm, the example collapsing strategy determiner 220 may determine the second quantity of PRMRs using other loop optimizations that may enable additional collapsing strategies, such as loop distribution algorithm, a loop interchange algorithm, etc., and/or a combination thereof.

In some examples, the collapsing strategy determiner 220 identifies the second optimization scenario as a candidate optimization scenario by comparing the first quantity of PRMRs to the second quantity of PRMRs. For example, the collapsing strategy determiner 220 may identify the second optimization scenario as a candidate optimization scenario when the second quantity of PRMRs is greater than the first quantity of PRMRs. In such examples, the collapsing strategy determiner 220 may assign the quantity of PRMRs associated with the second optimization scenario to be the second quantity of PRMRs.

In some examples, the collapsing strategy determiner 220 identifies the second optimization scenario to be a candidate optimization scenario when the first loop associated with the first optimization scenario is determined to have a low trip count. For example, the collapsing strategy determiner 220 may identify the second optimization scenario as a candidate optimization scenario when a quantity of iterations associated with the first loop is less than an iteration threshold of 64 iterations, 128 iterations, etc. In some examples, the collapsing strategy determiner 220 identifies one or more loop collapsing strategies in addition to the first loop collapsing strategy.

In the illustrated example of FIG. 2, the optimizer 110 includes the optimization scenario analyzer 225 to execute a cost model (e.g., an optimization cost model, a loop optimization cost model, etc.) based on one or more detected PRMRs to identify an optimization scenario to transform the HLL instructions 104. The example optimization scenario analyzer 225 selects a candidate optimization scenario of interest to process. In some examples, the optimization scenario analyzer 225 includes means to determine if a loop associated with the candidate optimization scenario has one or more PRMRs and if the loop is vectorizable. For example, the optimization scenario analyzer 225 may identify the candidate optimization scenario as an invalid optimization scenario when the candidate optimization scenario has zero PRMRs or the loop is not vectorizable. The invalid optimization scenario may be discarded and/or otherwise eliminated from subsequent processing.

In some examples, the optimization scenario analyzer 225 includes means to calculate and/or otherwise determine optimization parameters for a loop when the loop is vectorizable and/or the loop has at least one PRMR. For example, the optimization scenario analyzer 225 may invoke the parameter calculator 230 to calculate a first set of optimization parameters including at least one of a first VF parameter, a first UF parameter, or a first cost parameter (e.g., an execution cost parameter). In some examples, the optimization scenario analyzer 225 determines a candidate set of optimization parameters based on the first set. For example, the optimization scenario analyzer 225 may compare the first set to a candidate set. In some examples, the optimization scenario analyzer 225 assigns parameter values included in the first set to parameter values included in the candidate set when the first cost is less than a cost included in the candidate set. In other examples, the optimization scenario analyzer 225 does not assign parameter values included in the first set to parameter values included in the candidate set when the first cost is greater than the cost included in the candidate set.

In some examples, the optimization scenario analyzer 225 determines a candidate optimization scenario to generate the second IR 116 of FIG. 1 by comparing (1) a candidate cost parameter included in the candidate set associated with the candidate optimization scenario to (2) a cost parameter determined using prior optimization methods or techniques. For example, the optimization scenario analyzer 225 may identify the candidate optimization scenario to generate the second IR 116 when the candidate cost parameter is less than the cost parameter determined using one or more prior optimization methods. In other examples, the optimization scenario analyzer 225 may invalidate the candidate optimization scenario when the candidate cost parameter is greater than the cost parameter determined using the one or more prior optimization methods.

In the illustrated example of FIG. 2, the optimizer 110 includes the parameter calculator 230 to generate, calculate, and/or otherwise determine optimization parameters or optimization factors corresponding to an optimization scenario of interest. In some examples, the parameter calculator 230 includes means to identify and/or otherwise determine candidate VFs for the optimization scenario using prior vectorization algorithms. In some examples, the parameter calculator 230 calculates a least common multiple (LCM) based on a length of each PRMR of a loop associated with the optimization scenario.

In some examples, the parameter calculator 230 calculates a value of a UF parameter and/or a cost parameter based on a VF parameter of interest. For example, the parameter calculator 230 may select a first VF parameter of interest to process. The example parameter calculator 230 may determine a first UF parameter based on at least one of the LCM of the first VF parameter, the LCM of the PRMRs associated with the loop, or the first VF parameter. Additionally or alternatively, the example parameter calculator 230 may process one or more additional VF parameters of interest to the first VF parameter to determine one or more additional UF parameters to the first UF parameter as described above.

In some examples, the parameter calculator 230 calculates a cost parameter by determining an (estimated) execution cost incurred by the target computing device 118 of FIG. 1 when executing the LLL instructions 106 that are generated based on deploying an optimization scenario including a VF parameter of interest and a UF parameter of interest. The optimization scenario may include performing at least one of vectorization, loop unrolling, gather-to-shuffle optimization, constant folding, or LICM based on the VF parameter of interest and/or the UF parameter of interest.

In some examples, the parameter calculator 230 determines a candidate set of optimization parameters associated with a candidate optimization scenario. For example, the parameter calculator 230 may compare the first cost parameter to a candidate cost parameter. The example parameter calculator 230 may assign the first set of optimization parameters as the candidate set of optimization parameter based on the first cost parameter being less than the candidate cost parameter. In some examples, the candidate cost parameter represents an execution cost incurred by the target computing device 118 of FIG. 1 by executing the LLL instructions 106, where the LLL instructions 106 are generated based on the candidate optimization scenario. The candidate cost parameter is less than execution cost(s) associated with the target computing device 118 executing the LLL instructions 106 generated using other candidate optimization scenario(s).

In the illustrated example of FIG. 2, the optimizer 110 includes the loop collapser 235 to collapse a loop based on an identified candidate optimization scenario. For example, the loop collapser 235 may correspond to a compiler optimization that can perform loop collapsing optimizations on a loop of interest. In some examples, the loop collapser 235 includes means to collapse a loop using a collapsing strategy determined by the collapsing strategy determiner 220. For example, the loop collapser 235 may collapse a first loop (e.g., an inner loop) and a second loop (e.g., an outer loop) by combining at least the first loop into the second loop, combining at least the second loop into the first loop, etc.

The example optimizer 110 of FIG. 2 includes the example loop vectorizer 240 to vectorize a loop based on the identified candidate optimization scenario. In some examples, the loop vectorizer 240 includes means to vectorize a loop using a vectorization technique with a VF parameter determined by the optimization scenario analyzer 225.

In the illustrated example of FIG. 2, the optimizer 110 includes the loop unroller 245 to unroll a loop based on the identified candidate optimization scenario. For example, the loop unroller 245 may correspond to a compiler optimization that can perform loop unrolling optimizations on a loop of interest. Loop unrolling is a loop transformation technique that removes or reduces iterations by eliminating loop control instructions and loop test instructions. For example, loop unrolling may replace a for loop with a trip count of five iterations with five sequential operations. In some examples, the loop unroller 245 includes means to unroll a loop using an unrolling technique with a UF parameter determined by the optimization scenario analyzer 225. For example, the loop unroller 245 may transform PRMRs in the loop into loop-independent vector memory references, which can reduce an execution cost of a computing device implementing and/or otherwise executing the LLL instructions 106.

In the illustrated example of FIG. 2, the optimizer 110 includes the constant folder 250 to apply constant folding based on the identified candidate optimization scenario. For example, the constant folder 250 may correspond to a compiler optimization that can perform constant folding optimizations on a loop of interest. Constant folding is a compiler optimization technique that recognizes and evaluates constant expressions (e.g., i=160*100*16) at compile time rather than computing the constant expressions at runtime. For example, the compiler 100 may not generate two multiply instructions and a store for the statement of "i=160*100*16;" and, instead, substitute the computed value of 256,000 for the expression. In some examples, the constant folder 250 includes means to apply a constant folding technique to a loop to expose loop-independent address computation of PRMRs of the loop.

In the illustrated example of FIG. 2, the optimizer 110 includes the example gather-to-shuffle optimizer 255 to apply gather-to-shuffle optimization based on the identified candidate optimization scenario. For example, the gather-to-shuffler optimizer 255 may correspond to a compiler optimization that can perform gather-to-shuffle optimizations on a loop of interest. Gather-to-shuffle optimization is a compiler optimization technique that recognizes non-adjacent vector data loads and stores (i.e., gathers and scatters) that can be replaced with set(s) of adjacent vector loads and stores and vector permutations and shuffles that can perform the same operations. In some examples, the gather-to-shuffle optimizer 255 includes means to apply gather-to-shuffle optimization on PRMRs of a loop to turn (expensive) vector gather instructions into (cheaper) adjacent vector loads and shuffle instructions. In some examples, the gather-to-shuffle optimizer 255 applies gather-to-shuffle optimization on the loop after the constant folder 250 performs the constant folding technique but prior to applying LICM on the loop. In other examples, the gather-to-shuffle optimizer 255 applies gather-to-shuffle optimization after applying LICM to the loop.

In the illustrated example of FIG. 2, the optimizer 110 includes the LICM 260 to apply LICM optimization based on the identified candidate optimization scenario. For example, the LICM 260 may correspond to a compiler optimization that can perform loop invariant code motion optimizations on a loop of interest. In some examples, the LICM 260 includes means to apply a LICM technique to a loop to move or transfer processed PRMRs (e.g., optimized PRMRs) and dependent instructions outside of the loop. In some examples, the LICM 260 generates the second IR 116 of FIG. 2 after applying the LICM technique to one or more loops of a loop nest included in the first IR 114 of FIG. 1.

In the illustrated example of FIG. 2, the optimizer 110 includes the database 265 to record data (e.g., PRMRs, optimization scenarios, candidate optimization scenarios, optimization parameters, candidate optimization parameters, etc.). For example, the database 265 may be implemented and/or otherwise represented by the example machine readable instructions 900 of FIG. 9. The example database 265 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 265 may additionally or alternatively be implemented by one or more double data rate (DDR) memories, such as DDR, DDR2, DDR3, DDR4, mobile DDR (mDDR), etc. The example database 265 may additionally or alternatively be implemented by one or more mass storage devices such as hard disk drive(s), compact disk drive(s), digital versatile disk drive(s), solid-state disk drive(s), etc. While in the illustrated example the database 265 is illustrated as a single database, the database 265 may be implemented by any number and/or type(s) of databases. Furthermore, the data stored in the example database 265 may be in any data format such as, for example, binary data, comma delimited data, tab delimited data, structured query language (SQL) structures, etc.

While an example manner of implementing the example optimizer 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example PRMR detector 205, the example optimization scenario manager 210, the example optimization scenario generator 215, the example collapsing strategy determiner 220, the example optimization scenario analyzer 225, the example parameter calculator 230, the example loop collapser 235, the example loop vectorizer 240, the example loop unroller 245, the example constant folder 250, the example gather-to-shuffle optimizer 255, the example LICM 260, and the example database 265, and/or, more generally, the example optimizer 110 of FIG. 2 may be implemented by hardware, software, firmware, and/or any combination of hardware, software, and/or firmware. Thus, for example, any of the example PRMR detector 205, the example optimization scenario manager 210, the example optimization scenario generator 215, the example collapsing strategy determiner 220, the example optimization scenario analyzer 225, the example parameter calculator 230, the example loop collapser 235, the example loop vectorizer 240, the example loop unroller 245, the example constant folder 250, the example gather-to-shuffle optimizer 255, the example LICM 260, and the example database 265, and/or, more generally, the example optimizer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example PRMR detector 205, the example optimization scenario manager 210, the example optimization scenario generator 215, the example collapsing strategy determiner 220, the example optimization scenario analyzer 225, the example parameter calculator 230, the example loop collapser 235, the example loop vectorizer 240, the example loop unroller 245, the example constant folder 250, the example gather-to-shuffle optimizer 255, the example LICM 260, and/or the example database 265 is/are hereby expressly defined to include a non-transitory computer readable storage device or storage disk such as a memory, a digital versatile disk (DVD), a compact disk (CD), a Blu-ray disk, etc., including the software and/or firmware. Further still, the example optimizer 110 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the optimizer 110 of FIGS. 1-2 are shown in FIGS. 3-21. The machine readable instructions may be an executable program or portion of an executable program for execution by a computer processor such as the processor 2212 shown in the example processor platform 2200 discussed below in connection with FIG. 22. The program may be embodied in software stored on a non-transitory computer readable storage medium such as a CD-ROM, a floppy disk, a hard drive, a DVD, a Blu-ray disk, or a memory associated with the processor 2212, but the entire program and/or parts thereof could alternatively be executed by a device other than the processor 2212 and/or embodied in firmware or dedicated hardware. Further, although the example program is described with reference to the flowcharts and/or machine readable instructions illustrated in FIGS. 3-21, many other methods of implementing the example optimizer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-21 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 3:
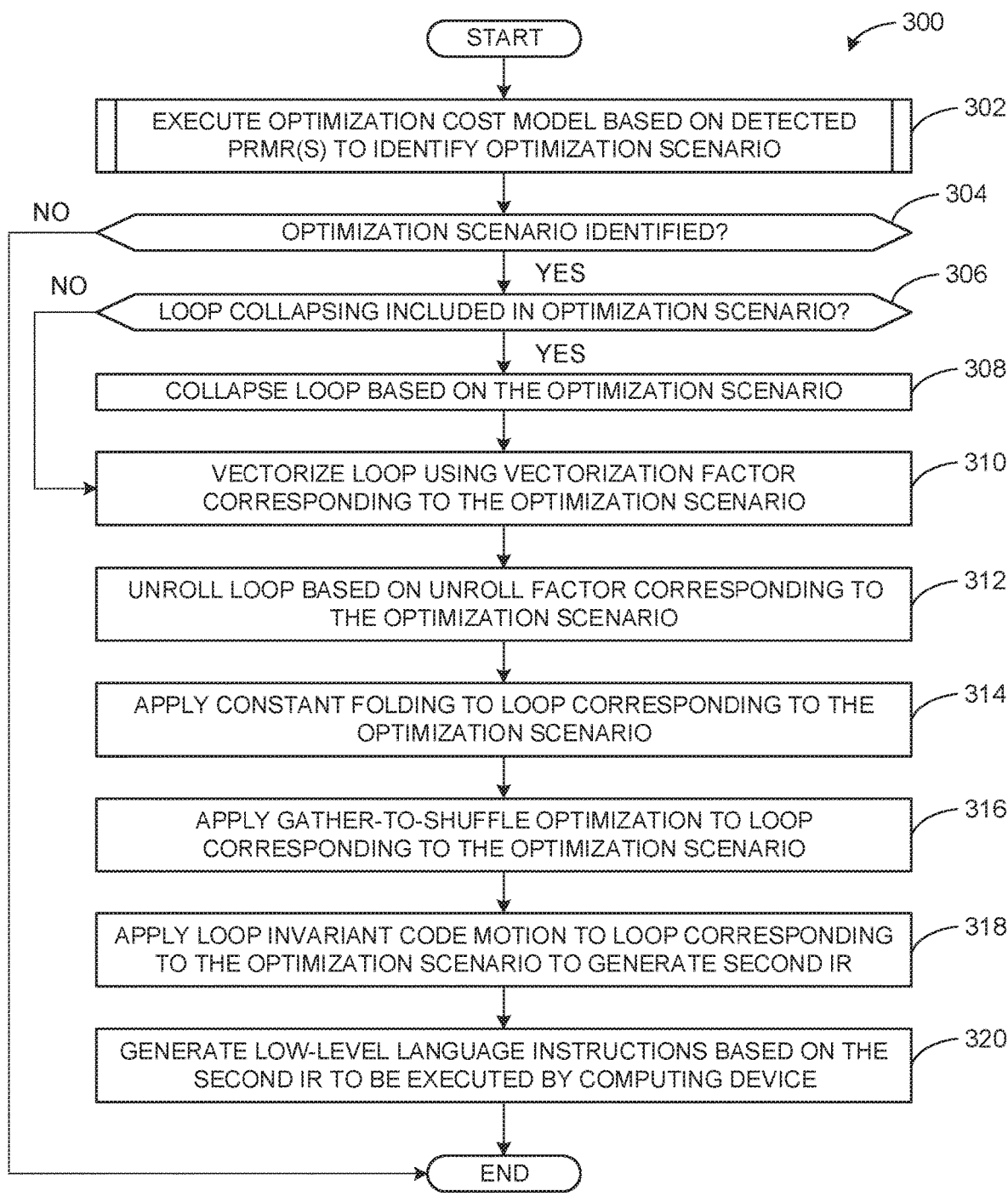
FIG. 3 is a flowchart representative of example machine readable instructions which may be executed to implement the example optimizer of FIG. 2 to generate example low-level language instructions that may be executed by a target computing device.

FIG. 3 is a flowchart representative of example machine readable instructions 300 that may be executed to implement the example optimizer 110 of FIGS. 1-2, and/or, more generally, the example compiler 100 of FIG. 1 to generate the example LLL instructions 106 of FIG. 1 that may be executed by the target computing device 118 of FIG. 1. The example machine readable instructions 300 begin at block 302, at which the example optimizer 110 executes an optimization cost model based on the detected PRMR(s) to identify an optimization scenario. For example, the optimization scenario analyzer 225 (FIG. 2) may determine an optimization scenario including a loop collapsing strategy of interest to transform the loop of interest. In other examples, the optimization scenario analyzer 225 may determine an optimization scenario including one or more optimizations or optimization operations to be performed on the loop of interest based on one or more optimization parameters. Example processes that may be used to implement block 302 is described below in connection with FIGS. 4 and/or 11.

At block 304, the example optimizer 110 determines whether an optimization scenario is identified. For example, the optimization scenario analyzer 225 may identify an optimization scenario to transform the loop of interest based on determining that the optimization scenario had a lower cost parameter than one or more other candidate optimization scenarios. If, at block 304, the example optimizer 110 determines that an optimization scenario has not been identified, then the example machine readable instructions 300 conclude. For example, the optimizer 110 may determine to use an optimization method corresponding to different machine readable instructions than the machine readable instructions 300 of FIG. 3 to generate the LLL instructions 106.

If, at block 304, the example optimizer 110 determines that an optimization scenario has been identified, then, at block 306, the optimizer 110 determines whether loop collapsing is included in the optimization scenario. For example, the optimization scenario analyzer 225 may determine that the optimization scenario does not include a loop collapsing strategy. In other examples, the optimization scenario analyzer 225 may determine that the optimization scenario includes one or more loop collapsing strategies. If, at block 306, the example optimizer 110 determines that loop collapsing is not included in the optimization scenario, control proceeds to block 310 to vectorize the loop based on the vectorization factor corresponding to the optimization scenario. If, at block 306, the example optimizer 110 determines that loop collapsing is included in the optimization scenario, then, at block 308, the optimizer 110 collapses the loop based on the optimization scenario. For example, the loop collapser 235 (FIG. 2) may collapse the loop of interest by applying a corresponding loop collapsing strategy. For example, the loop collapser 235 may collapse inner loop (j) 1504 with outer loop (i) 1506 of FIG. 15 to generate the machine readable instructions 1600 of FIG. 16 based on the optimization scenario.

At block 310, the example optimizer 110 vectorizes the loop using a vectorization factor corresponding to the optimization scenario. For example, the loop vectorizer 240 (FIG. 2) may vectorize the loop of interest using a vectorization algorithm (e.g., a vectorization optimization, an optimization operation, etc.) based on a VF parameter associated with the optimization scenario. For example, the loop vectorizer 240 may vectorize the machine readable instructions 1600 of FIG. 16 to generate the machine readable instructions 1700 of FIG. 17 based on the optimization scenario.

At block 312, the example optimizer 110 unrolls the loop based on an unrolling factor corresponding to the optimization scenario. For example, the loop unroller 245 (FIG. 2) may unroll the loop of interest using a loop unrolling algorithm (e.g., a loop unrolling optimization, an optimization operation, etc.) based on a UF parameter associated with the optimization scenario. For example, the loop unroller 245 may process the machine readable instructions 1700 of FIG. 17 to generate the machine readable instructions 1800 of FIG. 18 based on the optimization scenario.

At block 314, the example optimizer 110 applies constant folding to the loop corresponding to the optimization scenario. For example, the constant folder 250 (FIG. 2) may apply constant folding (e.g., a constant folding optimization, an optimization operation, etc.) to the loop of interest to expose loop-independent address computation of one or more PRMRs included in the loop of interest. For example, the constant folder 250 may process the machine readable instructions 1800 of FIG. 18 to generate the machine readable instructions 1900 of FIG. 19 based on the optimization scenario.

At block 316, the example optimizer 110 applies gather-to-shuffle optimization to the loop corresponding to the optimization scenario. For example, the gather-to-shuffle optimizer 255 (FIG. 2) may apply a gather-to-shuffle algorithm (e.g., a gather-to-shuffle optimization, an optimization operation, etc.) on one or more PRMRs included in the loop of interest to convert and/or otherwise transform (expensive) vector gather instructions into (cheaper) adjacent vector loads and shuffle instructions. For example, the gather-to-shuffler optimizer 255 may process the machine readable instructions 1900 of FIG. 19 to generate the machine readable instructions 2000 of FIG. 20 based on the optimization scenario.

At block 318, the example optimizer 110 applies LICM to the loop corresponding to the optimization scenario to generate a second IR. For example, the LICM 260 (FIG. 2) may apply LICM to hoist the one or more PRMRs and corresponding dependent instructions outside of the loop of interest. The example LICM 260 may generate the second IR 116 of FIG. 1 by applying LICM to the one or more loops of interest. For example, the LICM 260 may process the machine readable instructions 2000 of FIG. 20 to generate the machine readable instructions 2100 of FIG. 21 based on the optimization scenario.

At block 320, the example code generator 112 generates LLL instructions based on the second IR to be executed by a computing device. For example, the code generator 112

(FIG. 1) may generate the LLL instructions 106 of FIG. 1 based on the second IR 116 generated by the optimizer 110. For example, the code generator 112 may generate the LLL instructions 106 based on the machine readable instructions 2100 of FIG. 21. In response to generating the LLL instructions 106 at block 324, the example machine readable instructions 300 of FIG. 3 conclude.

Figure 4:
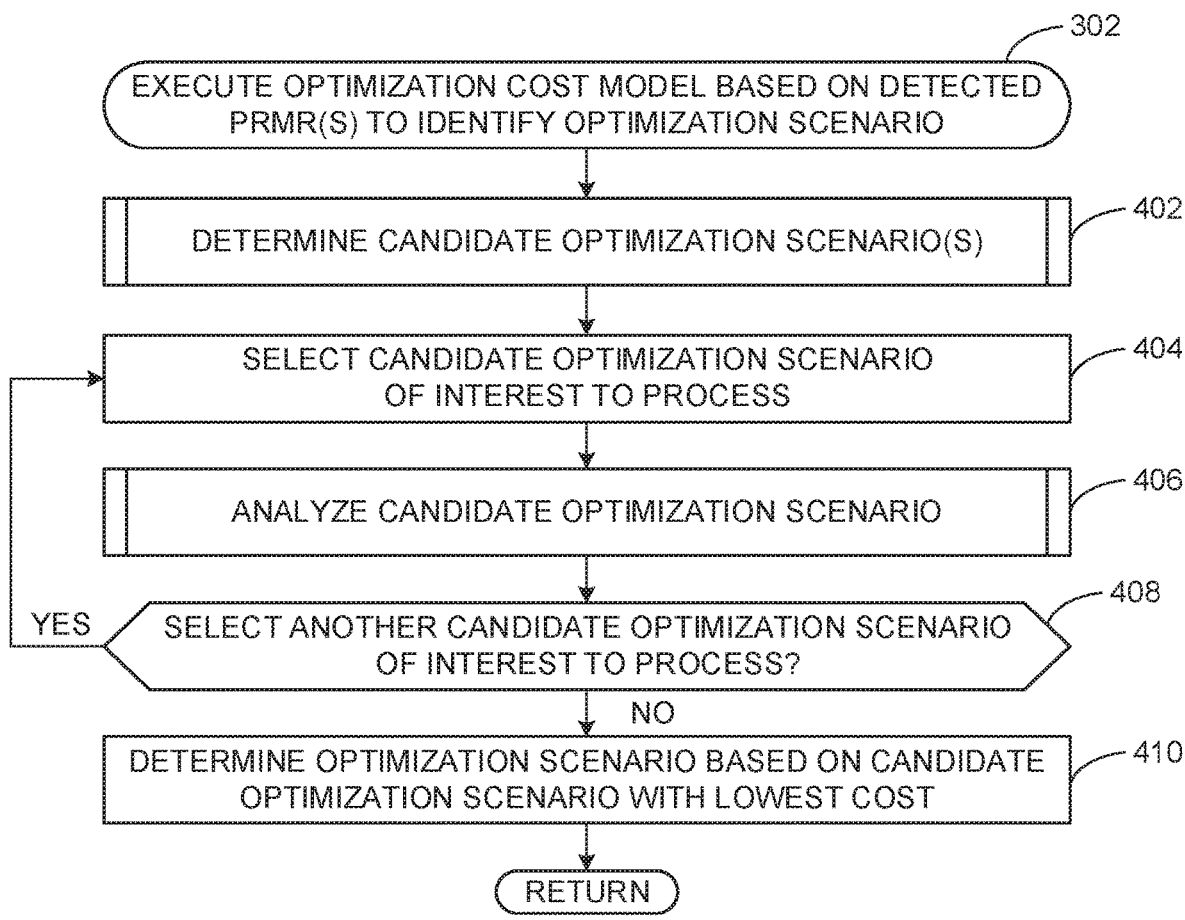
FIG. 4 is a flowchart representative of example machine readable instructions which may be executed to implement the example optimizer of FIG. 2 to execute an optimization cost model based on detected PRMR(s) to identify an optimization scenario.

FIG. 4 is a flowchart representative of the example machine readable instructions 302 of FIG. 3 that may be executed to implement the example optimizer 110 of FIGS. 1-2, and/or, more generally, the example compiler 100 of FIG. 1 to execute an optimization cost model based on detected PRMR(s) to identify an optimization scenario. The example process of FIG. 4 may be used to implement the operation of block 302 of FIG. 3 and/or example machine readable instructions 1100 depicted in FIG. 11.

The example machine readable instructions 302 begin at block 402, at which the example optimizer 110 determines candidate optimization scenario(s). For example, the optimization scenario manager 210 (FIG. 2) may generate a first optimization scenario associated with a first loop (e.g., the inner loop (j) 1504 of FIG. 15). The example optimization scenario manager 210 may identify the first optimization scenario as a first candidate optimization scenario when a first quantity of PRMRs included in the first loop is greater than a PRMR threshold. The example optimization scenario manager 210 may generate a second optimization scenario based on and/or otherwise associated with a first loop collapsing strategy. The example optimization scenario manager 210 may identify the second optimization scenario as a second candidate optimization scenario by determining whether a second quantity of PRMRs associated with the second optimization scenario (e.g., processing the first loop with the first loop collapsing strategy) is greater than the first quantity of PRMRs. Example processes that may be used to implement block 402 is described below in connection with FIGS. 5 and/or 12.

At block 404, the example optimizer 110 selects a candidate optimization scenario of interest to process. For example, the optimization scenario manager 210 may select the first candidate optimization scenario to process, where the first candidate optimization scenario is associated with the inner loop (j) 1504 of FIG. 15 to process.

At block 406, the example optimizer 110 analyzes the candidate optimization scenario. For example, the optimization scenario analyzer 225 (FIG. 2) may calculate optimization parameters including a candidate cost parameter for the first candidate optimization scenario. The example optimization scenario analyzer 225 may determine the optimization parameters based on the optimization parameters generating the lowest value for the cost parameter associated with the first candidate optimization scenario. Example processes that may be used to implement block 406 is described below in connection with FIGS. 7 and/or 13.

At block 408, the example optimizer 110 determines whether to select another candidate optimization scenario of interest to process. For example, the optimization scenario analyzer 225 may determine to process the second candidate optimization scenario to process. If, at block 408, the example optimizer 110 determines to select another candidate optimization scenario of interest to process, control returns to block 404 to select another candidate optimization scenario of interest to process.

If, at block 408, the example optimizer 110 determines not to select another candidate optimization scenario of interest to process, then, at block 410, the optimizer 110 determines an optimization scenario based on the candidate optimization scenario with the lowest cost. For example, the optimization scenario analyzer 225 may identify the first candidate optimization scenario as the optimization scenario based on the first candidate optimization scenario having the lowest cost out of all candidate optimization scenarios. In response to determining the optimization scenario at block 410, the example machine readable instructions 302 of FIG. 3 return to block 304 of the example of FIG. 3 to determine whether the optimization scenario has been identified.

Figure 5:
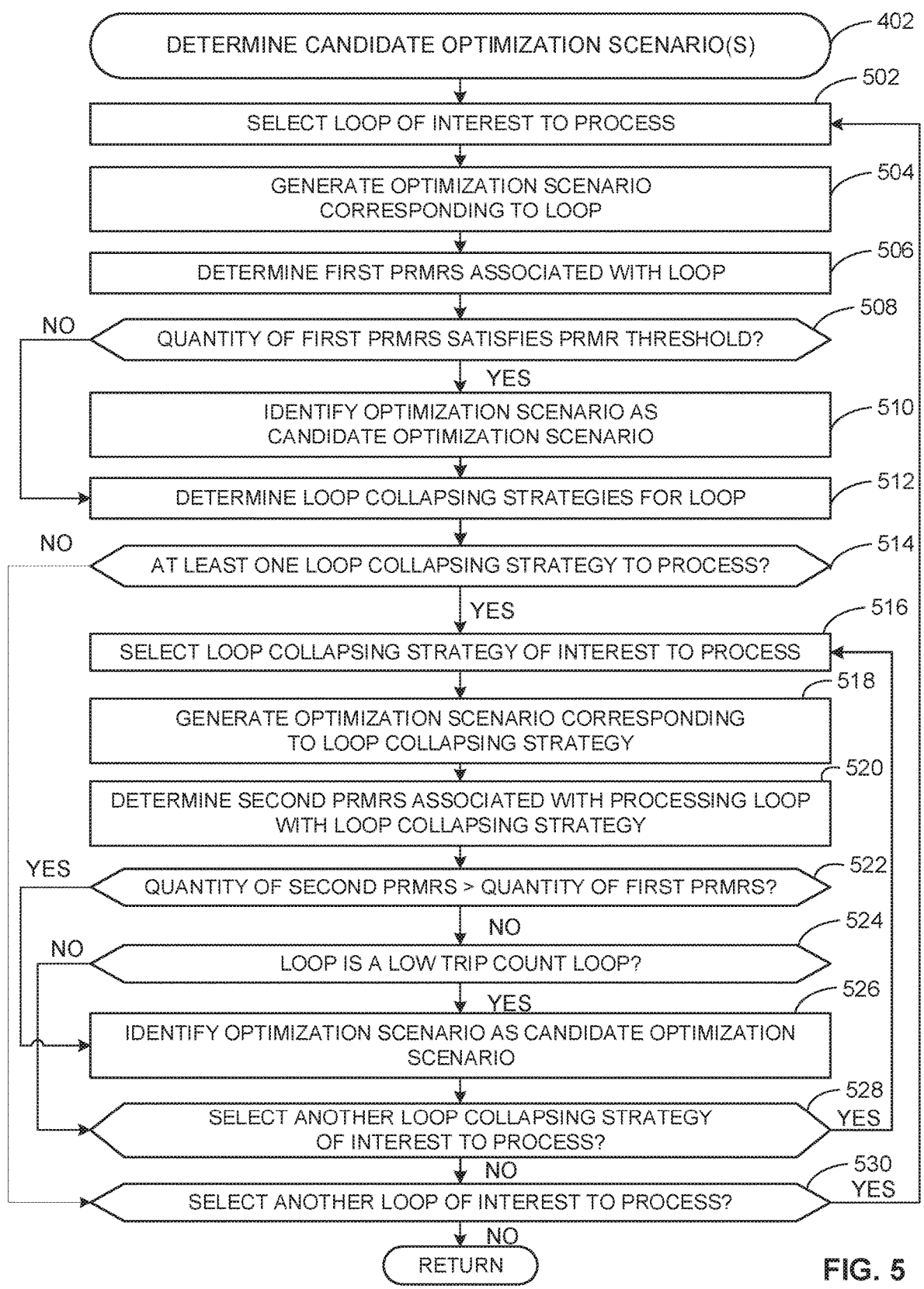
FIG. 5 is a flowchart representative of example machine readable instructions which may be executed to implement the example optimizer of FIG. 2 to determine candidate optimization scenarios.

FIG. 5 is a flowchart representative of the example machine readable instructions 402 of FIG. 4 that may be executed to implement the example optimizer 110 of FIGS. 1-2, and/or, more generally, the example compiler 100 of FIG. 1 to determine candidate optimization scenario(s). The example process of FIG. 5 may be used to implement the operation of block 402 of FIG. 4 and/or example machine readable instructions 1200 depicted in FIG. 12. The example machine readable instructions 402 begin at block 502, at which the example optimizer 110 selects a loop of interest to process. For example, the optimization scenario generator 215 (FIG. 2) may select the inner loop (j) 1504 of FIG. 15 to process.

At block 504, the example optimizer 110 generates an optimization scenario corresponding to the loop. For example, the optimization scenario generator 215 may generate a first optimization scenario corresponding to inner loop (j) 1504 of FIG. 15.

At block 506, the example optimizer 110 determines first PRMRs associated with the loop. For example, the optimization scenario generator 215 may instruct the PRMR detector 205 to detect PRMR(s) included in the inner loop (j) 1504 of FIG. 15 using the processes of FIGS. 6 and/or 10.

At block 508, the example optimizer 110 determines whether the quantity of the first PRMRs satisfies a PRMR threshold. For example, the optimization scenario generator 215 may determine that the inner loop (j) 1504 of FIG. 15 has one PRMR corresponding to filter[j %3] 1502 of FIG. 15. The example optimization scenario generator 215 may compare the quantity of PRMRs associated with the inner loop (j) 1504 to the PRMR threshold of zero PRMRs. The example optimization scenario generator 215 may determine that the quantity of one PRMR associated with the inner loop (j) 1504 satisfies the PRMR threshold of zero based on the quantity of one PRMR being greater than the PRMR threshold of zero.

If, at block 508, the example optimizer 110 determines that the quantity of first PRMRs does not satisfy the PRMR threshold, control proceeds to block 512 to determine loop collapsing strategies for the loop. If, at block 508, the example optimizer 110 determines that the quantity of first PRMRs satisfies the PRMR threshold, then, at block 510, the optimizer 110 identifies the first optimization scenario as a candidate optimization scenario. For example, the optimization scenario generator 215 may identify the first optimization scenario associated with the inner loop (j) 1504 of FIG. 15 as a first candidate optimization scenario.

At block 512, the example optimizer 110 determines loop collapsing strategies for the loop. For example, the collapsing strategy determiner 220 (FIG. 2) may determine a first loop collapsing strategy for the inner loop (j) 1504 of FIG. 15 that includes collapsing the inner loop (j) 1504 with the outer loop (i) 1506 of FIG. 15. Additionally or alternatively, the example collapsing strategy determiner 220 may determine a second loop collapsing strategy different than the first loop collapsing strategy for the inner loop (j) 1504 of FIG. 15.

At block 514, the example optimizer 110 determines whether there is at least one loop collapsing strategy to process. For example, the collapsing strategy determiner 220 may determine that prior loop collapsing algorithms did not identify any loop collapsing strategies applicable to the first loop. In other examples, the collapsing strategy determiner 220 may determine one or more loop collapsing strategies including a first loop collapsing strategy to process.

If, at block 514, the example optimizer 110 determines that there are no loop collapsing strategies to process, control proceeds to block 530 to determine whether to select another loop of interest to process. If, at block 514, the example optimizer 110 determines that there is at least one loop collapsing strategy to process, then, at block 516, the optimizer 110 selects a loop collapsing strategy of interest to process. For example, the collapsing strategy determiner 220 may select the first loop collapsing strategy to process.

At block 518, the example optimizer 110 generates an optimization scenario corresponding to the loop collapsing strategy. For example, the collapsing strategy determiner 220 may generate a second optimization scenario based on a collapsing scenario associated with the first loop collapsing strategy.

At block 520, the example optimizer 110 determines second PRMRs associated with processing the loop with the loop collapsing strategy. For example, the collapsing strategy determiner 220 may instruct the loop collapser 235 (FIG. 2) to collapse the inner loop (j) 1504 with the outer loop (i) 1506 to generate a collapsed loop. For example, collapsing the inner loop (j) 1504 with the outer loop (i) 1506 may correspond to a collapsed loop nest. The example collapsing strategy determiner 220 may instruct the PRMR detector 205 to detect a second set of PRMR(s) included in the collapsed loop. For example, the PRMR detector 205 may detect that the second set of PRMRs includes two PRMRs. The second set of PRMRs may be detected by the PRMR detector 205 using the processes of FIGS. 6 and/or 10.

At block 522, the example optimizer 110 determines whether the quantity of second PRMRs is greater than the quantity of the first PRMRs. For example, the collapsing strategy determiner 220 may compare the two PRMRs included in the second set of PRMRs to the one PRMR included in the first set of PRMRs and determine that quantity of the second set is greater than the quantity of the first set based on the comparison.

If, at block 522, the example optimizer 110 determines that the quantity of the second PRMRs is greater than the quantity of the first PRMRs, control proceeds to block 526 to identify the optimization scenario as a candidate optimization scenario. For example, the collapsing strategy determiner 220 may determine that the second optimization scenario is a second candidate optimization scenario based on the quantity of second PRMRs being greater than the quantity of first PRMRs.

If, at block 522, the example optimizer 110 determines that the quantity of second PRMRs is less than the quantity of the first PRMRs, then, at block 524, the optimizer 110 determines whether the loop is a low trip count loop. For example, the optimization scenario generator 215 may determine that the inner loop (j) 1504 of FIG. 15 is a low trip count. For example, the optimization scenario generator 215 may determine that the inner loop (j) 1504 has a trip count of 60, compare the trip count of 60 to a trip count threshold of 64 trips, and determine that the inner loop (j) 1504 is a low trip count based on the trip count of 60 trips being less than the trip count threshold of 64 trips.

If, at block 524, the example optimizer 110 determines that the loop is not a low trip count, control proceeds to block 528 to determine whether to select another loop collapsing strategy of interest to process. If, at block 524, the example optimizer 110 determines that the loop is a low trip count, then, at block 526, the optimizer 110 identifies the optimization scenario as a candidate optimization. For example, the collapsing strategy determiner 220 may determine that the second optimization scenario is a second candidate optimization scenario based on the inner loop (j) 1504 having a low trip count.

At block 528, the example optimizer 110 determines whether to select another loop collapsing strategy of interest to process. For example, the collapsing strategy determiner 220 may select the second loop collapsing strategy different than the first loop collapsing strategy to process. In other example, the collapsing strategy determiner 220 may determine that there is not another loop collapsing strategy to process.

If, at block 528, the example optimizer 110 determines to select another loop collapsing strategy of interest to process, control returns to block 516 to select another loop collapsing strategy of interest to process. If, at block 528, the example optimizer 110 determines not to select another loop collapsing strategy of interest to process, then, at block 530, the optimizer 110 determines whether to select another loop of interest to process. For example, the optimization scenario generator 215 may determine to select another loop of interest to process.

If, at block 530, the example optimizer 110 determines to select another loop of interest to process, control returns to block 502 to select another loop of interest to process. If, at block 530, the example optimizer 110 determines not to select another loop of interest to process, then the example machine readable instructions 402 return to block 404 of the example of FIG. 4 to select a candidate optimization scenario of interest to process.

Figure 6:
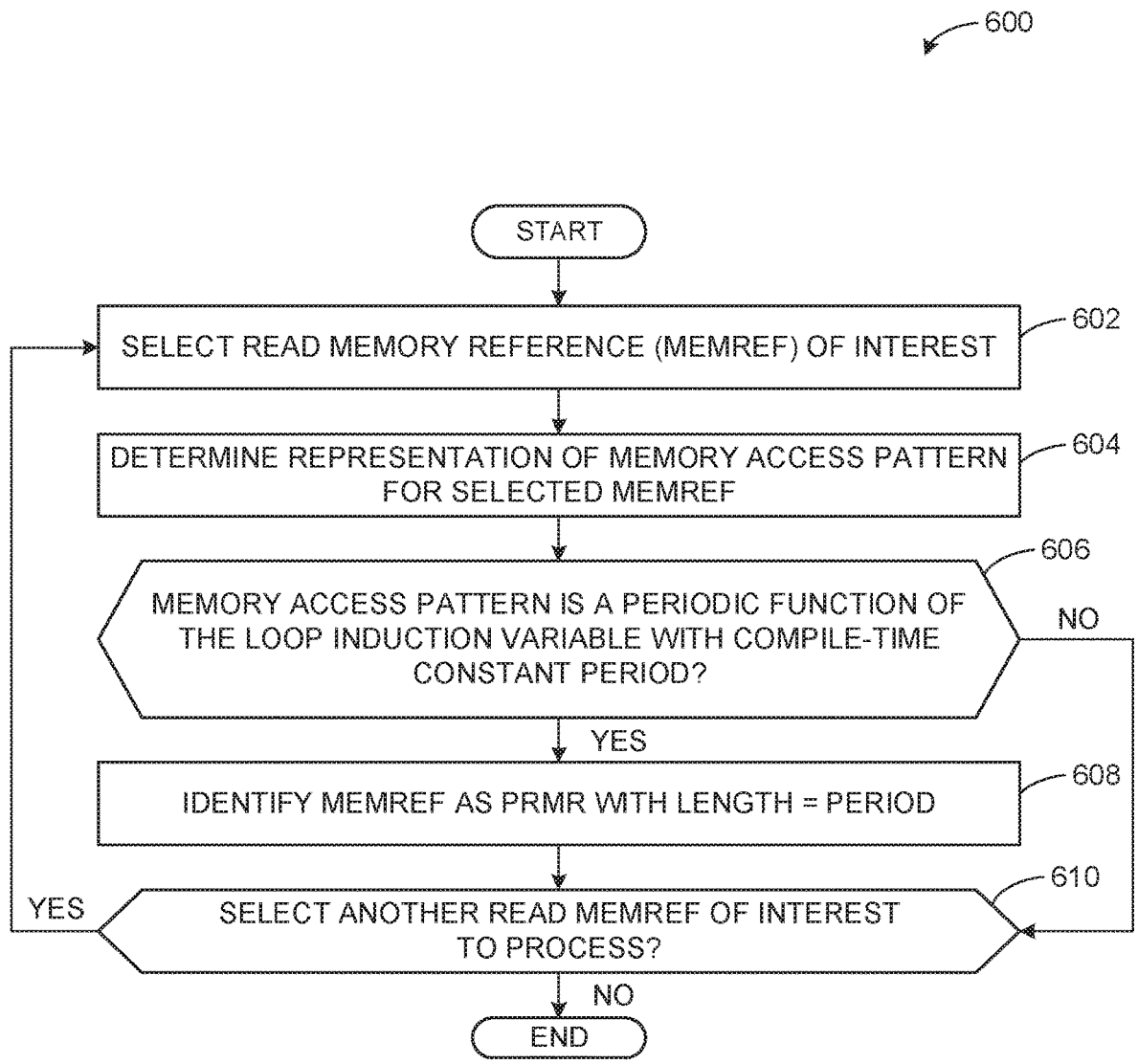
FIG. 6 is a flowchart representative of example machine readable instructions which may be executed to implement the example optimizer of FIG. 2 to detect PRMRs in high-level language instructions.

FIG. 6 is a flowchart representative of example machine readable instructions 600 that may be executed to implement the example optimizer 110 of FIGS. 1-2, and/or, more generally, the example compiler 100 of FIG. 1 to determine and/or otherwise detect PRMRs in a loop. For example, the process of FIG. 6 may be used to implement the operation of block 506 of FIG. 5, the operation of block 520 of FIG. 5, and/or example machine readable instructions 1000 depicted in FIG. 10. The example machine readable instructions 600 of FIG. 6 begin at block 602, at which the example optimizer 110 selects a read memory reference (MemRef) of interest. For example, the PRMR detector 205 may select the read MemRef of &filler[j %3] 1502 of FIG. 15 to process.

At block 604, the example optimizer 110 determines a representation of a memory access pattern for the selected MemRef. For example, the PRMR detector 205 may determine a representation of a memory access pattern for the MemRef &filter[j %3] 1502 of FIG. 15. In such examples, the PRMR detector 205 may determine the representation of the memory access pattern for the MemRef &filter[j %3] 1502 to be "filter+sizeof(float)*(RECURRENCE{j, TYPE=+, STEP=1}%3).

At block 606, the example optimizer 110 determines whether the memory access pattern is a periodic function of the loop induction variable with a compile-time constant period. For example, the PRMR detector 205 may determine that &filter[j %3] 1502 of FIG. 15 is a periodic function of the induction variable of the loop (j) with a period of three and therefore is a PRMR with a length of three. In other examples, the PRMR detector 205 may determine the following based on analyzing and/or otherwise processing the machine readable instructions 1500 of FIG. 15:

&input[i*6+j] 1508: Memory access pattern is not a periodic function of the loop induction variable with a constant period and therefore not a PRMR;

&base[j] 1510: Memory access pattern is not a periodic function of the loop induction variable with a constant period and therefore not a PRMR;

&exponent[j] 1512: Memory access pattern is not a periodic function of the loop induction variable with a constant period and therefore not a PRMR; and &output[i*6+j] 1514: Memory access pattern is not a periodic function of the loop induction variable with a constant period and therefore not a PRMR.

If at block 606, the example optimizer 110 determines that the memory access pattern is not a periodic function of the loop induction variable with a compile-time constant period, control proceeds to block 610 to determine whether to select another read MemRef of interest to process.

If, at block 606, the example optimizer 110 determines that the memory access pattern is a periodic function of the loop induction variable with a compile-time constant period, then, at block 608, the optimizer 110 identifies the MemRef as a PRMR with a length of the period. For example, the PRMR detector 205 may determine that the memory access pattern of MemRef &filter[j %3] 1502 is such a periodic function with period of three and identifies the MemRef as a PRMR having a length equal to the period of three.

At block 610, the example optimizer 110 determines whether to select another read MemRef of interest to process. For example, the PRMR detector 205 may determine to process &input[i*6+j] 1508 of FIG. 15. If, at block 610, the example optimizer 110 determines to select another read MemRef of interest to process, control returns to block 602 to select another read MemRef of interest to process. If, at block 610, the example optimizer 110 determines not to select another MemRef of interest to process, the example machine readable instructions 600 of FIG. 6 conclude. For example, the machine readable instructions 600 of FIG. 6 may return to block 508 of the example of FIG. 5 to determine whether the quantity of first PRMRs satisfies a PRMR threshold. In other examples, the machine readable instructions 600 of FIG. 6 may return to block 522 of the example of FIG. 5 to determine whether the quantity of second PRMRs is greater than the quantity of first PRMRs.

Figure 7:
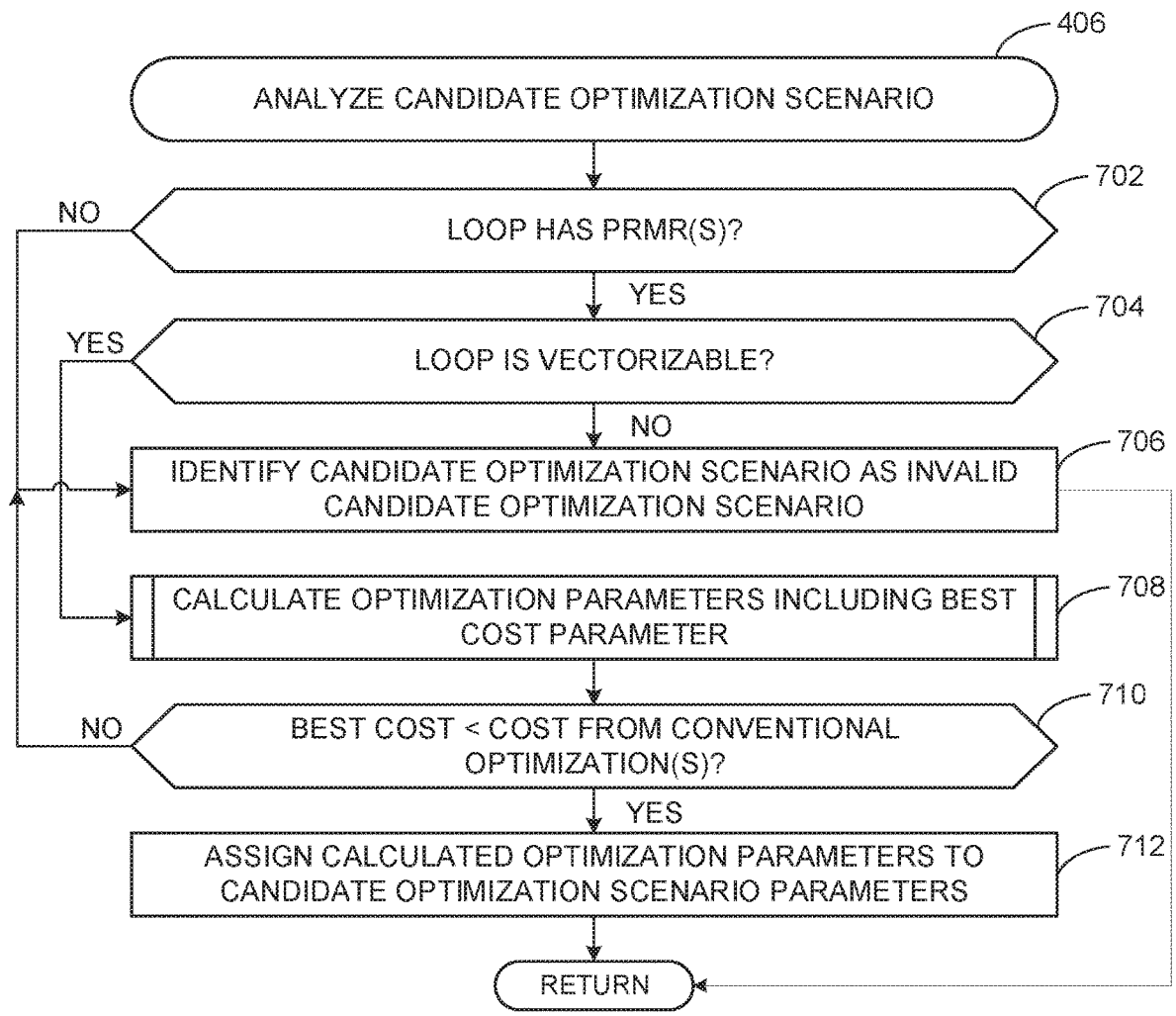
FIG. 7 is a flowchart representative of example machine readable instructions which may be executed to implement the example optimizer of FIG. 2 to analyze a candidate optimization scenario.

FIG. 7 is a flowchart representative of the example machine readable instructions 406 of FIG. 4 that may be executed to implement the example optimizer 110 of FIGS. 1-2, and/or, more generally, the example compiler 100 of FIG. 1 to analyze a candidate optimization scenario. The example process of FIG. 7 may be used to implement the operation of block 406 of FIG. 4 and/or example machine readable instructions 1300 depicted in FIG. 13.

The example machine readable instructions 406 begin at block 702, at which the example optimizer 110 determines whether a loop associated with the candidate optimization scenario has PRMR(s). For example, the optimization scenario analyzer 225 (FIG. 2) may query the database 265 (FIG. 2) for the first set of PRMRs corresponding to the first candidate optimization scenario associated with the inner loop (j) 1504 of FIG. 15. The example optimization scenario analyzer 225 may determine that the inner loop (j) 1504 has one or more PRMRs based on the inner loop (j) 1504 having one PRMR corresponding to filter[j %3] 1502 of FIG. 15.

If, at block 702, the example optimizer 110 determines that the loop does not have PRMR(s), control proceeds to block 706 to identify the candidate optimization scenario as an invalid candidate optimization scenario. If, at block 702, the example optimizer 110 determines that the loop has PRMR(s), then, at block 704, the optimizer 110 determines whether the loop is vectorizable. For example, the optimization scenario analyzer 225 may determine that the inner loop (j) 1504 of FIG. 15 is vectorizable.

If, at block 704, the example optimizer 110 determines that the loop is not vectorizable, then, at block 706, the optimizer 110 identifies the candidate optimization scenario as an invalid candidate optimization scenario. For example, the optimization scenario analyzer 225 may discard and/or otherwise remove the invalid candidate optimization scenario from further processing. In response to identifying the candidate optimization scenario as the invalid candidate optimization scenario at block 706, the example machine readable instructions 406 of FIG. 7 return to block 408 of the example of FIG. 4 to determine whether to select another candidate optimization scenario of interest to process.

If, at block 704, the example optimizer 110 determines that the loop is vectorizable, control proceeds to block 708 to calculate optimization parameters including a best cost parameter. For example, the parameter calculator 230 (FIG. 2) may calculate a set of optimization parameters including a best cost parameter, a best VF parameter, a best UF parameter, etc. The set of optimization parameters may have values that generate an execution cost associated with executing the example LLL instructions 106 of FIG. 1 on the target computing device 118 of FIG. 1, where the LLL instructions 106 are based on generating the second IR 116 of FIG. 1 using the candidate optimization scenario. The execution cost may be less than an execution cost associated with executing the example LLL instructions 106 that are generated using different optimization parameters. Example processes that may be used to implement block 708 is described below in connection with FIGS. 8 and/or 14.

At block 710, the example optimizer 110 determines whether the best cost is less than a cost from conventional optimization(s). For example, the optimization scenario analyzer 225 may determine that a first execution cost associated with executing the loop processed according to the candidate optimization scenario is less than a second execution cost associated with executing the loop processed according to prior optimization techniques.

If, at block 710, the example optimizer 110 determines that the best cost is not less than the cost from conventional optimization(s), control returns to block 706 to identify the candidate optimization scenario as an invalid candidate optimization scenario. If, at block 710, the example optimizer 110 determines that the best cost is less than the cost from conventional optimization(s), then, at block 712, the optimizer 110 assigns the calculated optimization parameters to candidate optimization scenario parameters. For example, the optimization scenario analyzer 225 may assign the set of optimization parameters including the best cost parameter, the best VF parameter, the best UF parameter, etc., to the set of candidate optimization parameters including the candidate cost parameter, the candidate VF parameter, the candidate UF parameter, etc. In response to assigning the calculated optimization parameters to the candidate optimization scenario parameters at block 712, the example machine readable instructions 406 of FIG. 7 return to block 408 of the example of FIG. 4 to determine whether to select another candidate optimization scenario of interest to process.

Figure 8:
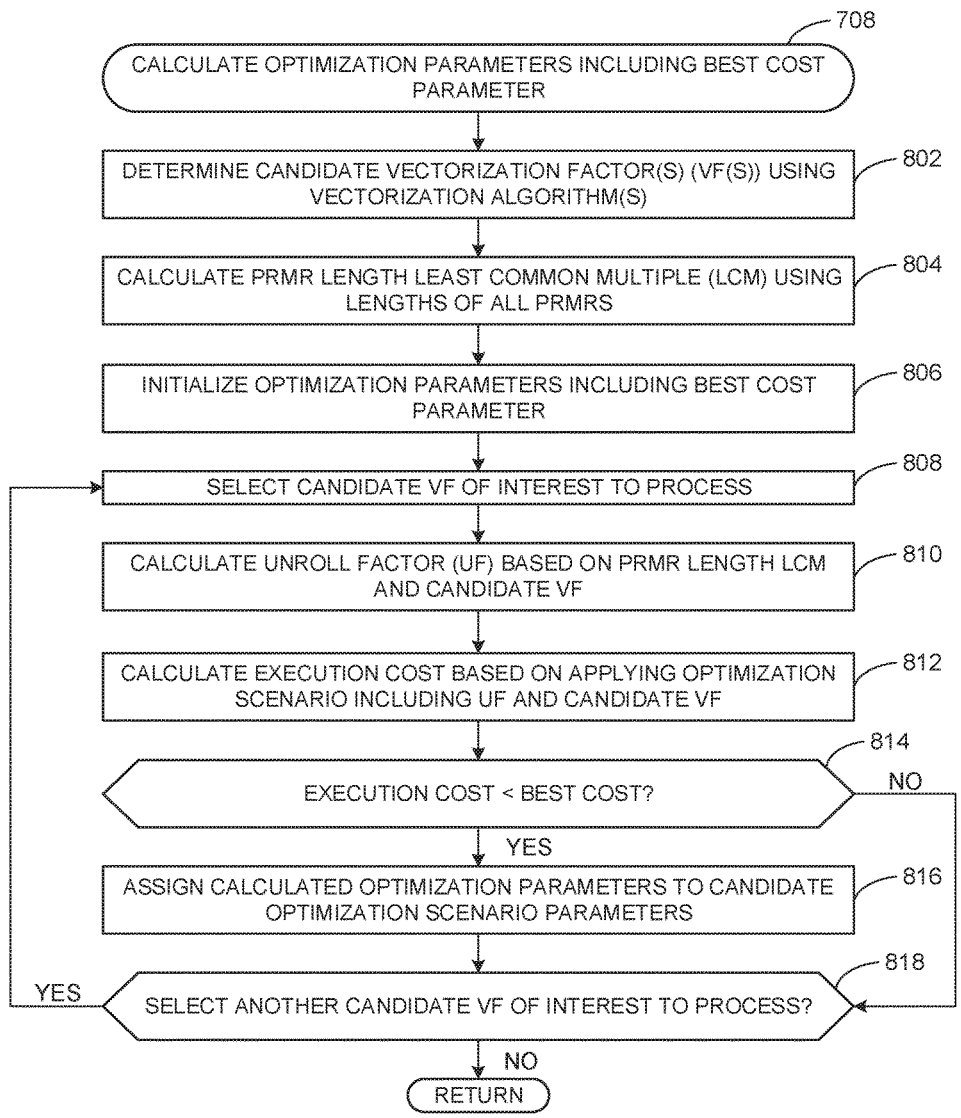
FIG. 8 is a flowchart representative of example machine readable instructions which may be executed to implement the example optimizer of FIG. 2 to calculate optimization parameters including a best cost parameter.

FIG. 8 is a flowchart representative of the example machine readable instructions 708 of FIG. 7 that may be executed to implement the example optimizer 110 of FIGS.

1-2, and/or, more generally, the example compiler 100 of FIG. 1 to calculate optimization parameters including the best cost parameter. The example process of FIG. 8 may be used to implement the operation of block 708 of FIG. 7 and/or the example machine readable instructions 1400 depicted in FIG. 14.

The example machine readable instructions 708 begin at block 802, at which the example optimizer 110 determines candidate VF(s) using vectorization algorithm(s). For example, the parameter calculator 230 (FIG. 2) may determine candidate VF parameter values of four and eight using one or more prior vectorization algorithms.

At block 804, the example optimizer 110 calculates a PRMR length least common multiple (LCM) using lengths of all PRMRs. For example, the parameter calculator 230 may determine that the PRMR length LCM is three based on the only PRMR corresponding to filter[j %3] 1502 of FIG. 15 having a length of three.

At block 806, the example optimizer 110 initializes optimization parameters including a best cost parameter. For example, the parameter calculator 230 may initialize the best cost parameter (BestCost) to an initialization value corresponding to an infinite value (e.g., a maximum value based on a quantity of allocated bytes to the best cost parameter, a 0xFF hex value, etc.), the best VF parameter (BestVF) to an initialization value of zero, and/or the best UF parameter (BestUF) of FIG. 15 to an initialization value of zero.

At block 808, the example optimizer 110 selects a candidate VF of interest to process. For example, the parameter calculator 230 may select the candidate VF parameter value of four to process. At block 810, the example optimizer 110 calculates a UF based on the PRMR length LCM and the candidate VF. For example, the parameter calculator 230 may determine that the UF is three based on a ratio of (1) the LCM of the PRMR length LCM of three and the candidate VF of four and (2) the candidate VF of four (e.g., UF of 3=LCM(4, 6)÷4).

At block 812, the example optimizer 110 calculates an execution cost based on applying the optimization scenario including the UF and the candidate VF. For example, the parameter calculator 230 may calculate an execution cost of 350 (e.g., an estimated 350 CPU clock cycles) by determining the estimated execution cost of the target computing device 118 of FIG. 1 executing the LLL instructions 106 of FIG. 1 based on applying the first candidate optimization scenario to the first IR 114 of FIG. 1 using the candidate VF of four and the calculated UF of three.

At block 814, the example optimizer 110 determines whether the execution cost is less than the best cost. For example, the parameter calculator 230 may determine that the execution cost of 300 is less than the infinite value.

If, at block 814, the example optimizer 110 determines that the optimization cost is not less than the best cost, control proceeds to block 818 to determine whether to select another candidate VF of interest to process. If, at block 814, the example optimizer 110 determines that the optimization cost is less than the best cost, then, at block 816, the optimizer 110 assigns the calculated optimization parameters to the candidate optimization scenario parameters. For example, the parameter calculator 230 may assign the candidate VF value of four to the value of the candidate optimization scenario VF parameter, the candidate UF value of three to the value of the candidate optimization scenario UF parameter, the candidate best cost of 300 to the candidate optimization scenario best cost parameter, etc.

At block 818, the example optimizer 110 determines whether to select another candidate VF of interest to process. For example, the parameter calculator 230 may select the candidate VF of eight to process. If, at block 818, the example optimizer 110 determines to select another candidate VF of interest to process, control returns to block 808 to select another candidate VF of interest to process. If, at block 818, the example optimizer 110 determines not to select another candidate VF of interest to process, the example machine readable instructions 708 of FIG. 8 return to block 710 of the example of FIG. 7 to determine whether the best cost parameter is less than the cost from conventional optimization(s).

FIG. 9 depicts the example machine readable instructions 900 that may be executed to implement the example optimizer 110 of FIGS. 1-2, and/or, more generally, the example compiler 100 of FIG. 1 to store optimization information associated with an optimization scenario. The example machine readable instructions 900 of FIG. 9 may be used to implement the database 265 of FIG. 2. The example machine readable instructions 900 of FIG. 9 correspond to an example struct (struct OptimizationScenario) that includes information corresponding to a potential optimization scenario for PRMRs.

FIG. 10 depicts the example machine readable instructions 1000 that may be executed to implement the example optimizer 110 of FIGS. 1-2, and/or, more generally, the example compiler 100 of FIG. 1 to detect and/or otherwise determine PRMRs included in a loop (e.g., a loop included in the first IR 114 of FIG. 1). The example machine readable instructions 1000 of FIG. 10 may be used to implement the process of FIG. 6. For example, the machine readable instructions 1000 may be executed and/or otherwise implemented by the PRMR detector 205 (FIG. 2).

In some examples, the PRMR detector 205 executes the machine readable instruction 1000 of FIG. 10 to determine whether a read MemRef is a periodic function of the loop induction variable with a compile-time constant period. If true, the example PRMR detector 205 identifies the MemRef as a PRMR with a length equal to the period. If false, the example PRMR detector 205 does not identify the MemRef as a PRMR.

FIG. 11 depicts the example machine readable instructions 1100 that may be executed to implement the example optimizer 110 of FIGS. 1-2, and/or, more generally, the example compiler 100 of FIG. 1 to execute an optimization cost model based on detected PRMR(s) to identify an optimization scenario. The example machine readable instructions 1100 of FIG. 11 may be used to implement the process of FIG. 4. For example, the machine readable instructions 1100 may be executed and/or otherwise implemented by the optimization scenario manager 210 (FIG. 2). In some examples, the optimization scenario manager 210 executes the machine readable instruction 1100 of FIG. 11 to collect a set of potential optimization scenarios, determine optimization parameters for each one of the potential optimization scenarios in the set, and return an optimization scenario out of the potential optimization scenarios that has the smallest cost (e.g., the smallest execution cost).

FIG. 12 depicts the example machine readable instructions 1200 that may be executed to implement the example optimizer 110 of FIGS. 1-2, and/or, more generally, the example compiler 100 of FIG. 1 to determine candidate optimization scenarios corresponding to a loop and/or a loop nest of interest. The example machine readable instructions 1200 of FIG. 12 may be used to implement the process of FIG. 5. For example, the machine readable instructions 1200 may be executed and/or otherwise implemented by the optimization scenario generator 215 (FIG. 2), the example collapsing strategy determiner 220 (FIG. 2), and/or, more generally, the optimization scenario manager 210 (FIG. 2).

In some examples, the optimization scenario generator 215 executes the machine readable instructions 1200 of FIG. 12 to determine a first set of candidate optimization scenarios based on determining whether a quantity of PRMRs associated with a loop of interest is greater than a PRMR threshold. The example optimization scenario generator 215 may return the first set. In other examples, the collapsing strategy determiner 220 executes the machine readable instructions 1200 of FIG. 12 to determine a second set of candidate optimization scenarios based on determining a loop collapsing strategy, generating a collapsed loop based on a loop of interest using the loop collapsing strategy, and determining whether a quantity of PRMRs associated with the collapsed loop is greater than a quantity of PRMRs associated with the loop of interest. The example collapsing strategy determiner 220 may return the second set.

FIG. 13 depicts the example machine readable instructions 1300 that may be executed to implement the example optimizer 110 of FIGS. 1-2, and/or, more generally, the example compiler 100 of FIG. 1 to analyze a candidate optimization scenario corresponding to a loop and/or a loop nest of interest. The example machine readable instructions 1300 of FIG. 13 may be used to implement the process of FIG. 7. For example, the machine readable instructions 1300 may be executed and/or otherwise implemented by the optimization scenario analyzer 225 (FIG. 2).

In some examples, the optimization scenario analyzer 225 executes the machine readable instructions 1300 of FIG. 13 to calculate a set of optimization parameters for a loop of interest when the optimization scenario analyzer 225 determines that the loop of interest is vectorizable and has at least one PRMR. The example optimization scenario analyzer 225 may assign the calculated optimization parameters as the candidate optimization parameters associated with the candidate optimization scenario when the calculated best cost parameter (BestCost) is determined to be lower than the (execution) cost of prior optimizations. The example optimization scenario analyzer 225 may execute the example machine readable instructions 1300 of FIG. 13 to return the candidate optimization parameters. In other examples, the optimization scenario analyzer 225 determines that a candidate optimization scenario is invalid when the optimization scenario analyzer 225 determines that the loop of interest is not vectorizable or does not have at least one PRMR. The example optimization scenario analyzer 225 may return a value associated with an invalid candidate optimization parameter (e.g., a null value).

FIG. 14 depicts the example machine readable instructions 1400 that may be executed to implement the example optimizer 110 of FIGS. 1-2, and/or, more generally, the example compiler 100 of FIG. 1 to calculate optimization parameters including a best cost parameter corresponding to candidate optimization scenario of interest. The example machine readable instructions 1400 of FIG. 14 may be used to implement the process of FIG. 8. For example, the machine readable instructions 1400 may be executed and/or otherwise implemented by the parameter calculator 230 (FIG. 2).

In some examples, the parameter calculator 230 executes the machine readable instructions 1400 to determine candidate VFs (PotentialVFs) and determine one or more optimization parameters based on at least one of a candidate VF of interest and the PRMR length LCM (PRMRsLengthLCM). The optimization parameters include at least one of a UF parameter or an execution cost parameter (Cost). In FIG. 14, the parameter calculator 230 may determine an optimization parameter such as the UF parameter for first ones of one or more optimizations associated with the optimization scenario by determining a ratio of a first LCM and a quantity of iterations of the loop to be executed after applying second ones of one or more optimizations included in the optimization plan, the second ones previous to the first ones, where the first LCM is based on the quantity of iterations and a second LCM, the second LCM based on one or more lengths of one or more of the PRMRs. For example, the first LCM may correspond to the term "LCM(VF, OptimizationScenario.PRMRsLengthLCM)" and the second LCM may correspond to the term "OptimizationScenario.PRMRsLengthLCM." In such examples, the term "VF" may correspond to a quantity of iterations of the loop to be executed after applying the optimizations (i.e., vectorization) previous to the instant optimization(s) included in the optimization plan.

In FIG. 14, the execution cost parameter corresponds to an estimated execution cost incurred by the target computing device 118 of FIG. 1 when executing the example LLL instructions 106 of FIG. 1 that are generated using a candidate optimization scenario of interest. The candidate optimization scenario of interest includes applying one or more optimization techniques with the candidate VF and the UF parameters, where the one or more optimization techniques include at least one of vectorization, loop unrolling, gather-to-shuffle optimization, constant folding, or LICM.

In some examples, the parameter calculator 230 executes the machine readable instructions 1400 of FIG. 14 to assign the calculated optimization parameters (e.g., Cost, VF, UF) to the candidate optimization parameters (e.g., BestCost, BestVF, BestUF) when the optimization cost is less than the best cost parameter. The example parameter calculator 230 may execute the example machine readable instructions 1400 of FIG. 14 to return the candidate optimization parameters.

FIG. 15 depicts the example machine readable instructions 1500 that may be improved and/or otherwise optimized by the example optimizer 110 of FIGS. 1-2, and/or, more generally, the example compiler 100 of FIG. 1. The example machine readable instructions 1500 include an example loop nest 1518 including the example inner loop (j) 1504 (i.e., for (int j=0; j<6; j++) and the example outer loop (i) 1506 (i.e., for (int i=0; i<1024; ++i). For example, the PRMR detector 205 (FIG. 2) may process the inner loop (j) 1504 to determine that filter[j %3] 1502 corresponds to a PRMR with a length of three.

FIG. 16 depicts example machine readable instructions 1600 generated by the example optimizer 110 of FIGS. 1-2, and/or, more generally, the example compiler 100 of FIG. 1 after collapsing the inner loop (j) 1504 with the outer loop (i) 1506 of FIG. 15 based on the optimization scenario identified at blocks 306 and 308 of FIG. 3. For example, the optimization scenario analyzer 225 may identify an optimization scenario to improve and/or otherwise optimize the loop nest included in the machine readable instructions 1500 of FIG. 15. The optimization scenario may include a loop collapsing strategy of collapsing the inner loop (j) 1504 with the outer loop (i) 1506 of FIG. 15. The optimization scenario may include optimization parameters including a VF of four and a UF of three. The example loop collapser 235 may process the loop nest 1518 of FIG. 15 to generate the example collapsed loop 1602 of FIG. 16 (i.e., for (int ij=0; ij<6144; ++ij).

FIG. 17 depicts example machine readable instructions 1700 generated by the example optimizer 110 of FIGS. 1-2, and/or, more generally, the example compiler 100 of FIG. 1 after vectorizing the loop 1602 of FIG. 16 based on the VF parameter corresponding to the optimization scenario identified at blocks 302 and 304 of FIG. 3. For example, the loop vectorizer 240 may vectorize the collapsed loop 1602 of FIG. 16 using one or more prior vectorization techniques based on a VF of four to generate the example vectorized loop nest 1702 of FIG. 17.

FIG. 18 depicts example machine readable instructions 1800 generated by the example optimizer 110 of FIGS. 1-2, and/or, more generally, the example compiler 100 of FIG. 1 after unrolling the vectorized loop nest 1702 of FIG. 17 based on the UF parameter corresponding to the optimization scenario identified at blocks 302 and 304 of FIG. 3. For example, the loop unroller 245 may unroll the vectorized loop nest 1702 of FIG. 17 using one or more prior unrolling techniques based on a UF of three to convert the PRMRs included in the vectorized loop nest 1702 of FIG. 17 into an example unrolled loop nest 1802 including example loop-independent vector memory references 1804 depicted in FIG. 18.

FIG. 19 depicts example machine readable instructions 1900 generated by the example optimizer 110 of FIGS. 1-2, and/or, more generally, the example compiler 100 of FIG. 1 after applying constant folding to the unrolled loop nest 1802 of FIG. 18 based on the optimization scenario identified at blocks 302 and 304 of FIG. 3. For example, the constant folder 250 may apply constant folding to the unrolled loop nest 1802 of FIG. 18 using one or more prior loop constant folding techniques to expose loop-independent address computation of PRMRs. For example, the constant folder 250 may apply constant folding to the unrolled loop nest 1802 of FIG. 18 to simplify the gather_offset*variables (e.g., gather_offset3_1, gather_offset6_1, etc.).

FIG. 20 depicts example machine readable instructions 2000 generated by the example optimizer 110 of FIGS. 1-2, and/or, more generally, the example compiler 100 of FIG. 1 after applying gather-to-shuffle optimization to the example folded (e.g., constantly folded) loop nest 1902 of FIG. 19 based on the optimization scenario identified at blocks 302 and 304 of FIG. 3. For example, the gather-to-shuffle optimizer 255 may apply gather-to-shuffle optimization on the PRMRs included in loop nest 1902 of FIG. 19 using one or more prior gather-to-shuffle techniques. The example gather-to-shuffle optimizer 255 converted and/or otherwise transformed (potentially slower) vector gather instructions into (potentially faster) adjacent vector loads and shuffle instructions.

FIG. 21 depicts example machine readable instructions 2100 generated by the example optimizer 110 of FIGS. 1-2, and/or, more generally, the example compiler 100 of FIG. 1 after applying LICM to the example machine readable instructions 2000 of FIG. 20 based on the optimization scenario identified at blocks 302 and 304 of FIG. 3. For example, the LICM 260 may apply LICM to the example machine readable instructions 2000 of FIG. 20 to move the loop optimized PRMRs (e.g., the loop invariant PRMRs) and dependent instructions (e.g., the loop invariant instructions associated with the loop invariant PRMRs) outside of the loop. For example, the optimizer 110 may convert the PRMR &filter[j %3] 1502 of FIG. 15 into the loop-invariant vector memory loads and vector shuffle instructions of FIG. 20. The example optimizer 110 may move the loop-invariant vector memory loads and vector shuffle instructions corresponding to the PRMR &filter[j %3] 1502 out of the loop as depicted in FIG. 21. The example machine readable instructions 2100 of FIG. 21 may correspond to the second IR 116 of FIG. 1. For example, the code generator 112 of FIG. 1 may generate the LLL instructions 106 based on the machine readable instructions 2100 of FIG. 21. The example LLL instructions 106 based on the example machine readable instructions 2100 of FIG. 21 may be executed by the target computing device 118 with a first execution cost. The first execution cost can be less than a second execution cost associated with not optimizing the example machine readable instructions 1500 of FIG. 15 based on the optimization scenario identified at blocks 302 and 304 of FIG. 3.

Figure 22:
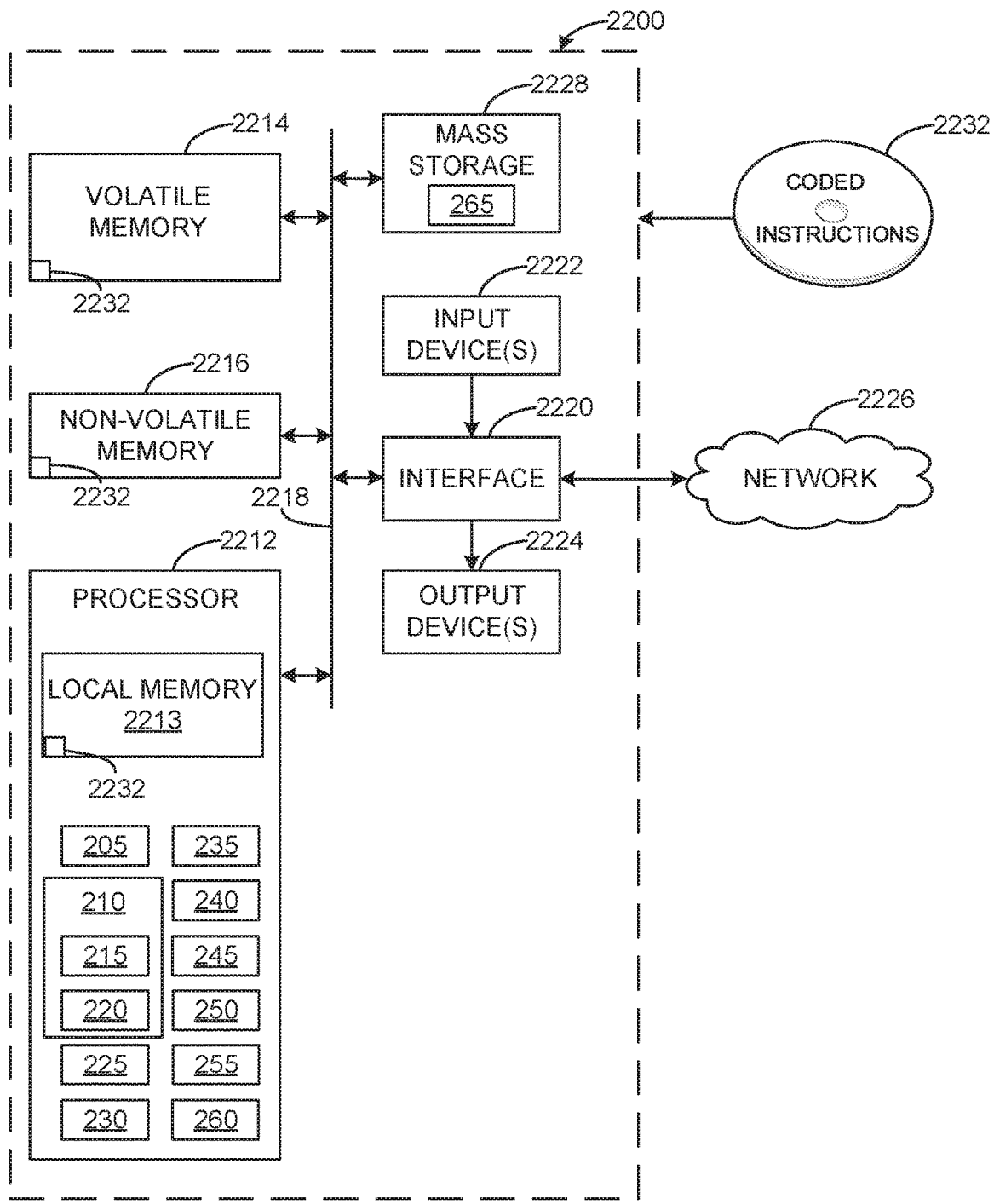
FIG. 22 is a block diagram of an example processing platform structured to execute the instructions of FIGS. 3-21 to implement the example optimizer of FIG. 2.

FIG. 22 is a block diagram of an example processor platform 2200 structured to execute the instructions of FIGS. 3-21 to implement the example optimizer 110 of FIGS. 1-2. The processor platform 2200 can be, for example, a server, a personal computer, a workstation, a self-learning machine (e.g., a neural network), a mobile device (e.g., a cell phone, a smart phone, a tablet such as an iPad™), or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2212 implements the example PRMR detector 205, the example optimization scenario manager 210, the example optimization scenario generator 215, the example collapsing strategy determiner 220, the example optimization scenario analyzer 225, the example parameter calculator 230, the example loop collapser 235, the example loop vectorizer 240, the example loop unroller 245, the example constant folder 250, the example gather-to-shuffle optimizer 255, and the example LICM 260 of FIG. 2.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), a Bluetooth® interface, a near field communication (NFC) interface, and/or a PCI express interface.

In the illustrated example, one or more input devices 2222 are connected to the interface circuit 2220. The input device(s) 2222 permit(s) a user to enter data and/or commands into the processor 2212. The input device(s) 2222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 2220 of the illustrated example, thus, typically includes a graphics driver card, a graphics driver chip, and/or a graphics driver processor.

The interface circuit 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, redundant array of independent disks (RAID) systems, and digital versatile disk (DVD) drives. In this example, the mass storage devices 2228 implement the example database 265 of FIG. 2.

The machine executable instructions 2232 of FIGS. 3-21 may be stored in the mass storage device 2228, in the volatile memory 2214, in the non-volatile memory 2216, and/or on a removable non-transitory computer readable storage medium such as a CD or DVD.

From the foregoing, it will be appreciated that example methods, apparatus and articles of manufacture have been disclosed that improve and/or otherwise optimize loops used to generate LLL instructions. LLL instructions based on the improved loops reduce an execution cost of a target computing device compared to prior loop optimization techniques. The disclosed methods, apparatus, and articles of manufacture improve the efficiency of using a computing device by reducing a quantity of computing resources to execute LLL instructions based on loops optimized with examples disclosed herein. The disclosed methods, apparatus, and articles of manufacture are accordingly directed to one or more improvement(s) in the functioning of a computer. Examples disclosed herein determine and apply an improved sequence of loop transformations and corresponding optimization parameters for loops with one or more PRMRs compared to prior optimization techniques. The improved sequence of loop transformations leads to an efficient vectorization of a corresponding loop nest and converts included PRMRs into loop invariant vector memory loads that result in a considerable performance improvement versus prior optimization techniques.

The following pertain to further examples disclosed herein.

Example 1 includes an apparatus to improve loop optimization with predictable recurring memory reads (PRMRs), comprising an optimizer, the optimizer including an optimization scenario manager to generate an optimization plan associated with a loop and corresponding optimization parameters, the optimization plan including a set of one or more optimizations, an optimization scenario analyzer to identify the optimization plan as a candidate optimization plan when a quantity of PRMRs included in the loop is greater than a threshold, and a parameter calculator to determine the optimization parameters based on the candidate optimization plan, and a code generator to generate instructions to be executed by a processor, the instructions based on processing the loop with the set of one or more optimizations included in the candidate optimization plan.

In example 2, the subject matter of example 1 can optionally include that the loop is a first loop in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, the optimization scenario manager is to generate a second optimization plan associated with a second set of one or more optimizations, the second set including transforming the first loop with a set of loops included in the loop nest to generate a second loop, the second loop having a second iteration space different from the first iteration space, the second loop including second PRMRs, and the optimization scenario analyzer is to identify the second optimization plan as a second candidate optimization plan when a second quantity of the second PRMRs is greater than the first quantity of the first PRMRs.

In example 3, the subject matter of any one of examples 1-2 can optionally include that the parameter calculator is to determine the optimization parameters for ones of the second set, the second loop to execute in a single iteration corresponding to a quantity of iterations of the first loop, the quantity of iterations based on a multiple of a least common multiple of one or more lengths associated with the PRMRs.

In example 4, the subject matter of any one of examples 1-3 can optionally include that the loop is a first loop and the optimization scenario analyzer is to identify a set of one or more optimizations associated with the optimization plan that converts one or more of the PRMRs associated with the optimization plan into loop invariant PRMRs, the set of one or more optimizations is to transform the first loop into a second loop, the second loop to execute in a single iteration corresponding to a quantity of iterations of the first loop, the quantity of iterations based on a multiple of a least common multiple of one or more lengths associated with the PRMRs.

In example 5, the subject matter of any one of examples 1-4 can optionally include that the loop is a first loop and the parameter calculator is to determine the optimization parameters for the ones of the one or more optimizations that transform the first loop into a second loop, the second loop to execute in a single iteration corresponding to a quantity of iterations of the first loop, the quantity of iterations based on a multiple of a least common multiple of one or more lengths associated with the PRMRs.

In example 6, the subject matter of any one of examples 1-5 can optionally include that the parameter calculator is to determine the optimization parameters by calculating an unroll factor and is to calculate the unroll factor by determining a ratio of a first least common multiple (LCM) and a vectorization factor, the first LCM based on the vectorization factor and a second LCM, the second LCM based on lengths of PRMRs included in the PRMRs.

In example 7, the subject matter of any one of examples 1-6 can optionally include that the parameter calculator is to determine the optimization parameters of a first one of the one or more optimizations by determining a ratio of a first least common multiple (LCM) and a quantity of iterations of the loop to be executed after applying the one or more optimizations included in the optimization plan previous to the first one, the first LCM based on the quantity of iterations and a second LCM, the second LCM based on one or more lengths of one or more of the PRMRs.

Example 8 includes an apparatus to improve loop optimization with predictable recurring memory reads (PRMRs), comprising first means to generate an optimization plan associated with a loop and corresponding optimization parameters, the optimization plan including a set of one or more optimizations, second means to identify the optimization plan as a candidate optimization plan when a quantity of PRMRs included in the loop is greater than a threshold, and third means to determine the optimization parameters based on the candidate optimization plan, and fourth means to generate instructions to be executed by a processor, the instructions based on processing the loop with the set of one or more optimizations included in the candidate optimization plan.

In example 9, the subject matter of example 8 can optionally include that the loop is a first loop in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, the second means is to generate a second optimization plan associated with a second set of one or more optimizations, the second set including transforming the first loop with a set of loops included in the loop nest to generate a second loop, the second loop having a second iteration space different from the first iteration space, the second loop including second PRMRs, and the third means is to identify the second optimization plan as a second candidate optimization plan when a second quantity of the second PRMRs is greater than the first quantity of the first PRMRs.

In example 10, the subject matter of any one of examples 8-9 can optionally include that the third means is to determine the optimization parameters for ones of the second set, the second loop to execute in a single iteration corresponding to a quantity of iterations of the first loop, the quantity of iterations based on a multiple of a least common multiple of one or more lengths associated with the PRMRs.

In example 11, the subject matter of any one of examples 8-10 can optionally include that the loop is a first loop and the third means is to identify a set of one or more optimizations associated with the optimization plan that converts one or more of the PRMRs associated with the optimization plan into loop invariant PRMRs, the set of one or more optimizations is to transform the first loop into a second loop, the second loop to execute in a single iteration corresponding to a quantity of iterations of the first loop, the quantity of iterations based on a multiple of a least common multiple of one or more lengths associated with the PRMRs.

In example 12, the subject matter of any one of examples 8-11 can optionally include that the loop is a first loop and the third means is to determine the optimization parameters for the ones of the one or more optimizations that transform the first loop into a second loop, the second loop to execute in a single iteration corresponding to a quantity of iterations of the first loop, the quantity of iterations based on a multiple of a least common multiple of one or more lengths associated with the PRMRs.

In example 13, the subject matter of any one of examples 8-12 can optionally include that the third means is to determine the optimization parameters by calculating an unroll factor and is to calculate the unroll factor by determining a ratio of a first least common multiple (LCM) and a vectorization factor, the first LCM based on the vectorization factor and a second LCM, the second LCM based on lengths of PRMRs included in the PRMRs.

In example 14, the subject matter of any one of examples 8-13 can optionally include that the third means is to determine the optimization parameters of a first one of the one or more optimizations by determining a ratio of a first least common multiple (LCM) and a quantity of iterations of the loop to be executed after applying the one or more optimizations included in the optimization plan previous to the first one, the first LCM based on the quantity of iterations and a second LCM, the second LCM based on one or more lengths of one or more of the PRMRs.

Example 15 includes a non-transitory computer readable storage medium comprising instructions which, when executed, cause a machine to at least generate an optimization plan associated with a loop and corresponding optimization parameters, the optimization plan including a set of one or more optimizations, identify the optimization plan as a candidate optimization plan when a quantity of PRMRs included in the loop is greater than a threshold, and determine the optimization parameters based on the candidate optimization plan, and generate instructions to be executed by a processor, the instructions based on processing the loop with the set of one or more optimizations included in the candidate optimization plan.

In example 16, the subject matter of example 15 can optionally include that the loop is a first loop in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, further including instructions which, when executed, cause the machine to at least generate a second optimization plan associated with a second set of one or more optimizations, the second set including transforming the first loop with a set of loops included in the loop nest to generate a second loop, the second loop having a second iteration space different from the first iteration space, the second loop including second PRMRs, and identify the second optimization plan as a second candidate optimization plan when a second quantity of the second PRMRs is greater than the first quantity of the first PRMRs.

In example 17, the subject matter of any one of examples 15-16 can optionally include instructions which, when executed, cause the machine to at least determine the optimization parameters for ones of the second set, the second loop to execute in a single iteration corresponding to a quantity of iterations of the first loop, the quantity of iterations based on a multiple of a least common multiple of one or more lengths associated with the PRMRs.

In example 18, the subject matter of any one of examples 15-17 can optionally include that the loop is a first loop and further including instructions which, when executed, cause the machine to at least identify a set of one or more optimizations associated with the optimization plan that converts one or more of the PRMRs associated with the optimization plan into loop invariant PRMRs, the set of one or more optimizations is to transform the first loop into a second loop, the second loop to execute in a single iteration corresponding to a quantity of iterations of the first loop, the quantity of iterations based on a multiple of a least common multiple of one or more lengths associated with the PRMRs.

In example 19, the subject matter of any one of examples 15-18 can optionally include that the loop is a first loop and further including instructions which, when executed, cause the machine to at least determine the optimization parameters for the ones of the one or more optimizations that transform the first loop into a second loop, the second loop to execute in a single iteration corresponding to a quantity of iterations of the first loop, the quantity of iterations based on a multiple of a least common multiple of one or more lengths associated with the PRMRs.

In example 20, the subject matter of any one of examples 15-19 can optionally include instructions which, when executed, cause the machine to at least determine the optimization parameters by calculating an unroll factor and is to calculate the unroll factor by determining a ratio of a first least common multiple (LCM) and a vectorization factor, the first LCM based on the vectorization factor and a second LCM, the second LCM based on lengths of PRMRs included in the PRMRs.

In example 21, the subject matter of any one of examples 15-20 can optionally include instructions which, when executed, cause the machine to at least determine the optimization parameters of a first one of the one or more optimizations by determining a ratio of a first least common multiple (LCM) and a quantity of iterations of the loop to be executed after applying the one or more optimizations included in the optimization plan previous to the first one, the first LCM based on the quantity of iterations and a second LCM, the second LCM based on one or more lengths of one or more of the PRMRs.

Example 22 includes a method to improve loop optimization with predictable recurring memory reads (PRMRs), comprising generating an optimization plan associated with a loop and corresponding optimization parameters, the optimization plan including a set of one or more optimizations, identifying the optimization plan as a candidate optimization plan when a quantity of PRMRs included in the loop is greater than a threshold, and determining the optimization parameters based on the candidate optimization plan, and generating instructions to be executed by a processor, the instructions based on processing the loop with the set of one or more optimizations included in the candidate optimization plan.

In example 23, the subject matter of example 22 can optionally include that the loop is a first loop in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, and further include generating a second optimization plan associated with a second set of one or more optimizations, the second set including transforming the first loop with a set of loops included in the loop nest to generate a second loop, the second loop having a second iteration space different from the first iteration space, the second loop including second PRMRs, and identifying the second optimization plan as a second candidate optimization plan when a second quantity of the second PRMRs is greater than the first quantity of the first PRMRs.

In example 24, the subject matter of any one of examples 22-23 can optionally include determining the optimization parameters for ones of the second set, the second loop to execute in a single iteration corresponding to a quantity of iterations of the first loop, the quantity of iterations based on a multiple of a least common multiple of one or more lengths associated with the PRMRs.

In example 25, the subject matter of any one of examples 22-24 can optionally include that the loop is a first loop and further include identifying a set of one or more optimizations associated with the optimization plan that converts one or more of the PRMRs associated with the optimization plan into loop invariant PRMRs, the set of one or more optimizations is to transform the first loop into a second loop, the second loop to execute in a single iteration corresponding to a quantity of iterations of the first loop, the quantity of iterations based on a multiple of a least common multiple of one or more lengths associated with the PRMRs.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to improve loop optimization with predictable recurring memory reads (PRMRs), comprising:
   an optimizer implemented by a first processor, the optimizer including:
      an optimization scenario manager to generate an optimization plan associated with a first loop and corresponding optimization parameters, the optimization plan including a set of one or more optimizations;
      an optimization scenario analyzer to identify the optimization plan as a candidate optimization plan when a quantity of PRMRs included in the first loop is greater than a threshold, the candidate optimization plan to convert one or more of the PRMRs into loop-invariant PRMRs, the candidate optimization plan to transform the first loop into a second loop, a single iteration of the second loop corresponding to a quantity of iterations of the first loop, the quantity of iterations based on a least common multiple of one or more lengths associated with the PRMRs; and
      a parameter calculator to determine the optimization parameters based on the candidate optimization plan; and
   a code generator implemented by the first processor, the code generator to generate instructions to be executed by the first processor or a second processor, the instructions based on the optimizer processing the first loop with the set of one or more optimizations included in the candidate optimization plan.

2. The apparatus of claim 1, wherein the first loop is in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, the optimization scenario manager to generate a second optimization plan associated with a second set of one or more optimizations, the second set including transforming the first loop with a set of loops included in the loop nest to generate a third loop, the third loop having a second iteration space different from the first iteration space, the third loop including second PRMRs, and the optimization scenario analyzer to identify the second optimization plan as a second candidate optimization plan when a second quantity of the second PRMRs is greater than the first quantity of the first PRMRs.

3. The apparatus of claim 2, wherein the parameter calculator is to determine the optimization parameters for ones of the second set, the third loop to execute in a single iteration corresponding to the quantity of iterations of the first loop.

4. The apparatus of claim 1, wherein the parameter calculator is to determine the optimization parameters for one or more of the one or more optimizations that transform the first loop into the second loop.

5. The apparatus of claim 1, wherein the least common multiple (LCM) is a first LCM, and the parameter calculator to determine the optimization parameters by calculating an unroll factor, and calculate the unroll factor by determining a ratio of a second LCM and a vectorization factor, the second LCM based on the vectorization factor and the first LCM.

6. The apparatus of claim 1, wherein the quantity of iterations is a first quantity of iterations, the least common multiple (LCM) is a first LCM, and the parameter calculator to determine the optimization parameters of a first one of the one or more optimizations by determining a ratio of a second LCM and a second quantity of iterations of the first loop to be executed after applying the one or more optimizations included in the optimization plan previous to the first one of the one or more optimizations, the second LCM based on the second quantity of iterations and the first LCM.

7. The apparatus of claim 1, wherein the instructions are binary object code, and the first loop and the second loop include high-level language instructions associated with a source language.

8. A non-transitory computer readable storage medium comprising first instructions which, when executed, cause a machine to at least:
generate an optimization plan associated with a first loop and corresponding optimization parameters, the optimization plan including a set of one or more optimizations;
identify the optimization plan as a candidate optimization plan when a quantity of PRMRs included in the first loop is greater than a threshold, the candidate optimization plan to convert one or more of the PRMRs into loop-invariant PRMRs, the candidate optimization plan to transform the first loop into a second loop, a single iteration of the second loop corresponding to a quantity of iterations of the first loop, the quantity of iterations based on a least common multiple of one or more lengths associated with the PRMRs; and
determine the optimization parameters based on the candidate optimization plan; and
generate second instructions to be executed by a processor, the second instructions based on processing the first loop with the set of one or more optimizations included in the candidate optimization plan.

9. The non-transitory computer readable storage medium of claim 8, wherein the first loop is in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, and the first instructions, when executed, cause the machine to at least:
generate a second optimization plan associated with a second set of one or more optimizations, the second set including transforming the first loop with a set of loops included in the loop nest to generate a third loop, the third loop having a second iteration space different from the first iteration space, the third loop including second PRMRs; and
identify the second optimization plan as a second candidate optimization plan when a second quantity of the second PRMRs is greater than the first quantity of the first PRMRs.

10. The non-transitory computer readable storage medium of claim 9, wherein the first instructions which, when executed, cause the machine to at least determine the optimization parameters for ones of the second set, the third loop to execute in a single iteration corresponding to the quantity of iterations of the first loop.

11. The non-transitory computer readable storage medium of claim 8, wherein the first instructions which, when executed, cause the machine to at least determine the optimization parameters for one or more of the one or more optimizations that transform the first loop into the second loop.

12. The non-transitory computer readable storage medium of claim 8, wherein the least common multiple (LCM) is a first LCM, and the first instructions which, when executed, cause the machine to at least determine the optimization parameters by calculating an unroll factor, and calculate the unroll factor by determining a ratio of a second LCM and a vectorization factor, the second LCM based on the vectorization factor and the first LCM.

13. The non-transitory computer readable storage medium of claim 8, wherein the quantity of iterations is a first quantity of iterations, the least common multiple (LCM) is a first LCM, and the first instructions which, when executed, cause the machine to at least determine the optimization parameters of a first one of the one or more optimizations by determining a ratio of a second LCM and a second quantity of iterations of the first loop to be executed after applying the one or more optimizations included in the optimization plan previous to the first one of the one or more optimizations, the second LCM based on the second quantity of iterations and the first LCM.

14. The non-transitory computer readable storage medium of claim 8, wherein the second instructions are binary object code, and the first loop and the second loop include high-level language instructions associated with a source language.

15. A method to improve loop optimization with predictable recurring memory reads (PRMRs), comprising:
generating an optimization plan associated with a first loop and corresponding optimization parameters, the optimization plan including a set of one or more optimizations;
identifying the optimization plan as a candidate optimization plan when a quantity of PRMRs included in the first loop is greater than a threshold, the candidate optimization plan to convert one or more of the PRMRs into loop-invariant PRMRs, the candidate optimization plan to transform the first loop into a second loop, a single iteration of the second loop corresponding to a quantity of iterations of the first loop, the quantity of iterations based on a least common multiple of one or more lengths associated with the PRMRs;
determining the optimization parameters based on the candidate optimization plan; and
generating instructions to be executed by a processor, the instructions based on processing the first loop with the set of one or more optimizations included in the candidate optimization plan.

16. The method of claim 15, wherein the first loop is in a loop nest, the optimization plan is a first optimization plan, the set of one or more optimizations is a first set of one or more optimizations, the PRMRs are first PRMRs, the quantity of PRMRs is a first quantity of the first PRMRs, the first loop having a first iteration space, and the candidate optimization plan is a first candidate optimization plan, further including:

generating a second optimization plan associated with a second set of one or more optimizations, the second set including transforming the first loop with a set of loops included in the loop nest to generate a third loop, the third loop having a second iteration space different from the first iteration space, the third loop including second PRMRs; and identifying the second optimization plan as a second candidate optimization plan when a second quantity of the second PRMRs is greater than the first quantity of the first PRMRs.

17. The method of claim 16, further including determining the optimization parameters for ones of the second set, the third loop to execute in a single iteration corresponding to the quantity of iterations of the first loop.

18. The method of claim 15, wherein the instructions are binary object code, and the first loop and the second loop include high-level language instructions associated with a source language.

* * * * *